US008989900B2

(12) United States Patent
Nakamura et al.

(10) Patent No.: US 8,989,900 B2
(45) Date of Patent: Mar. 24, 2015

(54) ROBOT SYSTEM

(71) Applicant: Kabushiki Kaisha Yaskawa Denki, Kitakyushu-shi, Yahatanishi-ku (JP)

(72) Inventors: Tamio Nakamura, Kitakyushu (JP); Kenji Matsukuma, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 3 days.

(21) Appl. No.: 13/749,698

(22) Filed: Jan. 25, 2013

(65) Prior Publication Data
US 2013/0245821 A1   Sep. 19, 2013

(30) Foreign Application Priority Data

Mar. 16, 2012  (JP) .................................. 2012-060777

(51) Int. Cl.
*G06F 19/00* (2011.01)
*B25J 9/00* (2006.01)
(Continued)

(52) U.S. Cl.
CPC ............... *G06F 19/00* (2013.01); *B25J 9/0084* (2013.01); *B25J 19/06* (2013.01); *F16P 3/08* (2013.01);
(Continued)

(58) Field of Classification Search
CPC ....... B25J 9/1689; B25J 9/1697; E04G 21/22; E21B 17/1021; E21B 17/1078
USPC .................. 700/108, 245; 166/250.01, 255.2; 175/24, 40
See application file for complete search history.

(56) References Cited

U.S. PATENT DOCUMENTS 4,490,660 A * 12/1984 Tsuchihashi .................. 700/255
7,539,556 B2 * 5/2009 Oohashi ........................ 700/245
(Continued)

FOREIGN PATENT DOCUMENTS

CN   1496795   5/2004
CN   1972782   5/2007
(Continued)

OTHER PUBLICATIONS

Extended European Search Report for corresponding EP Application No. 13151302.0-1712, Jul. 30, 2013.
(Continued)

*Primary Examiner* — Mcdieunel Marc
(74) *Attorney, Agent, or Firm* — Mori & Ward, LLP

(57) ABSTRACT

A robot system, including one or more robots which are provided to a first area where an entry by a person is restricted, and configured to perform a first work which includes one or more steps in the first area, a controller configured to control an operation of the one or more robots, and a visitor detector configured to detect a visitor to the first area. The controller includes a first work control portion configured to control the one or more robots so that the one or more robots perform the first work in the first area, and a first suspension control portion configured to control a predetermined at least a first robot of the one or more of the robots when one or more of the robots are performing one of the steps in the first area based on control by the first work control portion and the visitor is detected by the visitor detector, so that the first robot performs a predetermined act of suspension after performing the first work up to any predetermined stage, including an intermediate stage of the one step, a successful completion stage of the one step, and a successful completion stage of another step after the one step.

12 Claims, 25 Drawing Sheets

(51) Int. Cl.
*B25J 19/06* (2006.01)
*F16P 3/08* (2006.01)
*F16P 3/14* (2006.01)
*B25J 9/16* (2006.01)

(52) U.S. Cl.
CPC ............... *F16P 3/142* (2013.01); *F16P 3/144* (2013.01); *B25J 9/1674* (2013.01); *G05B 2219/40202* (2013.01)
USPC ... 700/245; 700/185; 166/250.01; 166/255.2; 175/24; 175/40

(56) References Cited

U.S. PATENT DOCUMENTS

| | | | |
|---|---|---|---|
| 8,646,404 B2* | 2/2014 | Hendricks, Sr. | 118/503 |
| 8,665,328 B2* | 3/2014 | Doettling | 348/143 |
| 8,892,256 B2 | 11/2014 | Friedman et al. | |
| 2004/0061466 A1 | 4/2004 | Hashimoto et al. | |
| 2007/0297890 A1 | 12/2007 | Sjoberg et al. | |
| 2009/0128079 A1 | 5/2009 | Sjoberg | |
| 2009/0198380 A1 | 8/2009 | Friedman et al. | |
| 2009/0289791 A1 | 11/2009 | Onishi | |
| 2010/0208067 A1* | 8/2010 | Doettling | 348/143 |
| 2010/0236046 A1* | 9/2010 | Lundberg et al. | 29/430 |
| 2011/0298579 A1* | 12/2011 | Hardegger et al. | 340/3.1 |
| 2012/0127165 A1* | 5/2012 | Evans et al. | 345/419 |
| 2013/0000550 A1* | 1/2013 | Brown et al. | 118/301 |
| 2013/0138229 A1* | 5/2013 | Mizuura et al. | 700/83 |
| 2013/0245823 A1* | 9/2013 | Kimura et al. | 700/248 |
| 2013/0259611 A1* | 10/2013 | Yoshino | 414/223.01 |

FOREIGN PATENT DOCUMENTS

| | | |
|---|---|---|
| CN | 10/164590 | 5/2008 |
| CN | 101970186 | 2/2011 |
| EP | 1403010 A2 | 3/2004 |
| EP | 1728601 A1 | 12/2006 |
| EP | 1820611 A1 | 8/2007 |
| EP | 2218958 | 8/2010 |
| JP | 05-050390 | 3/1993 |
| JP | 05-077179 | 3/1993 |
| JP | 2000-003950 | 1/2000 |
| WO | WO 2009/097334 A2 | 8/2009 |
| WO | WO 2009/155947 A1 | 12/2009 |

OTHER PUBLICATIONS

Japanese Office Action for corresponding JP Application No. 2012-060777, Jan. 16, 2014.
Chinese Office Action for corresponding CN Application No. 201310031155.7, Nov. 15, 2014.
European Office Action for corresponding EP Application No. 13 151 302.0—1654, Jan. 5, 2015.

* cited by examiner

ROBOT SYSTEM

CROSS-REFERENCE TO RELATED APPLICATION

The present application claims priority from Japanese Patent Application No. 2012-060777, which was filed on Mar. 16, 2012, the disclosure of which is incorporated herein by reference in its entirety.

FIELD OF THE INVENTION

The present disclosure relates to a robot system.

DESCRIPTION OF THE RELATED ART

In Japanese patent laid open H05-50390, a painting robot system is disclosed.

SUMMARY OF THE INVENTION

According to one aspect of the disclosure, there is provided a robot system, including one or more robots which are provided to a first area where an entry by a person is restricted, and configured to perform a first work which includes one or more steps in the first area, a controller configured to control an operation of the one or more robots, and a visitor detector configured to detect a visitor to the first area. The controller includes a first work control portion configured to control the one or more robots so that the one or more robots perform the first work in the first area, and a first suspension control portion configured to control a predetermined at least a first robot of the one or more of the robots when one or more of the robots are performing one of the steps in the first area based on control by the first work control portion and the visitor is detected by the visitor detector, so that the first robot performs a predetermined act of suspension after performing the first work up to any predetermined stage, including an intermediate stage of the one step, a successful completion stage of the one step, and a successful completion stage of another step after the one step.

DESCRIPTION OF THE EMBODIMENTS

An embodiment will now be described with reference to accompanying drawings. This embodiment is an example wherein the robot system is applied to an office building comprising a cafeteria where a food and drink service is performed.

Figure 1:
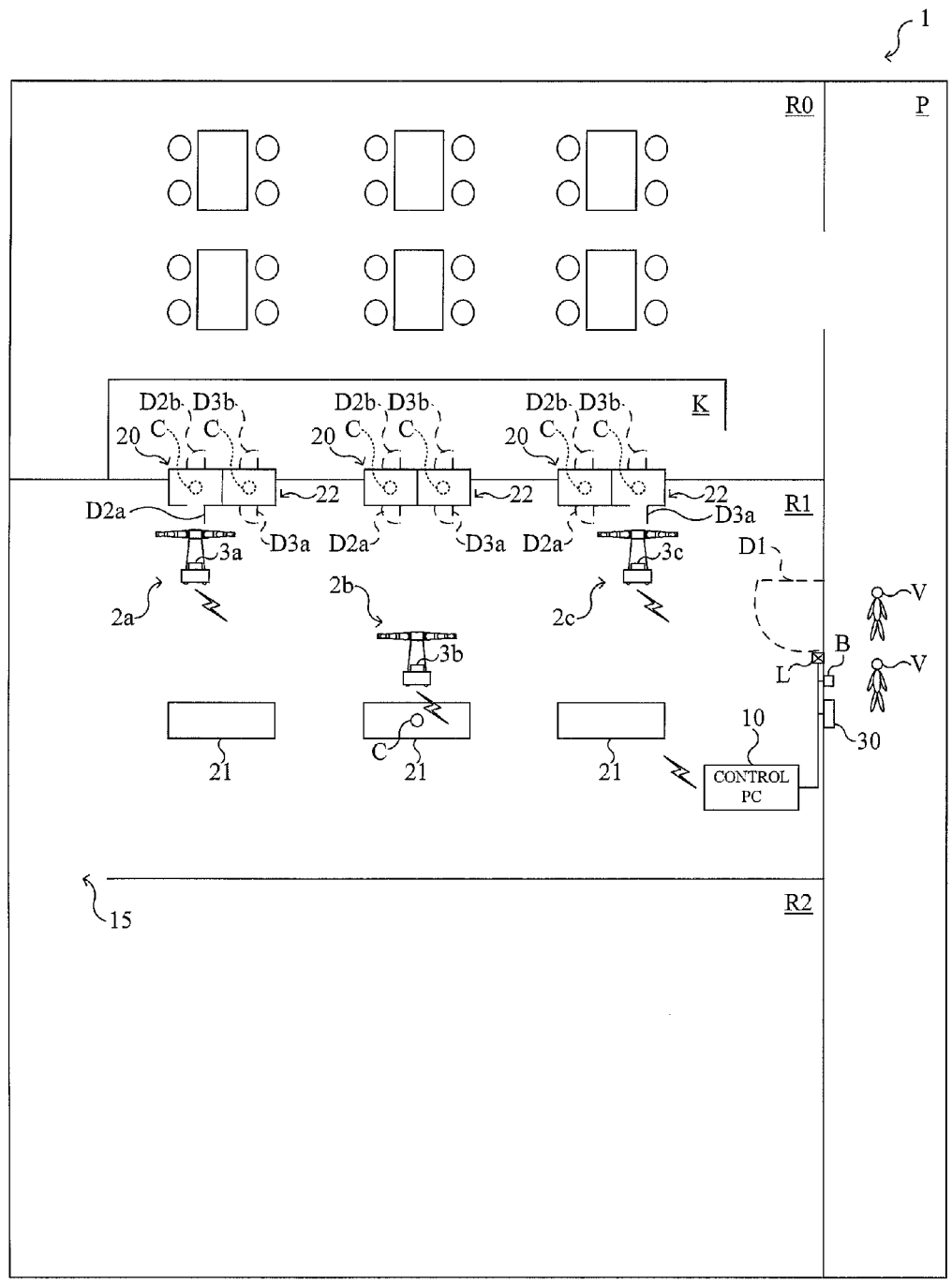
FIG. 1 is a system configuration diagram schematically showing the overall configuration of a robot system of an embodiment.

As shown in FIG. 1, this office building comprises a cafeteria R0, a room R1, a room R2, and a passageway P. The cafeteria R0 comprises a kitchen K. The room R1 is adjacent to the kitchen K side of this cafeteria R0. The room R2 is adjacent to this room R1. The passageway P connects the cafeteria R0 and the rooms R1 and R2. In the cafeteria R0, a food and drink provider (not shown) in the kitchen K provides food and drink to a food and drink recipient (not shown). The rooms R1 and R2 are rooms where entry is restricted. The rooms R1 and R2 are connected via a walkway 15. Note that, according to this embodiment, the overall room R1 is linked to the first area as well as the area where entry is restricted.

The room R1 is provided with three sets of a cabinet 20, a work table 21, and a cabinet 22. Each of the cabinets 20 and 22 is provided to each of the provision spaces provided between the room R1 and the kitchen K. Each of these cabinets 20 and 22 can be approached from both the room R1 side and the kitchen K side. An openable/closeable door D2a is provided to each of the cabinets 20, on the room R1 side. An openable/closeable door D2b is provided to each of the cabinets 20, on the kitchen K side. A drink vessel C (such as, for example, a cup, teacup, glass, etc.) is housed within each of these cabinets 20. Each of the work tables 21 is a table respectively used by the three robots 2a, 2b, and 2c described later for pouring a drink (such as, for example, coffee, tea, juice, etc.) into the vessel C. An object required when pouring the drink into the vessel C is provided on (or near) each of these work tables 21. Examples include a device such as a pot, pitcher, bottle, coffee maker, or dispenser filled with hot water, water, the drink itself, etc.; a vessel filled with drink ingredients, such as powder, tea leaves, tea bags, etc.; or an instrument such as a dripper, filter, or the like. An openable/closeable door D3a is provided to each of the cabinets 22, on the room R1 side. An openable/closeable door D3b is provided to each of the cabinets 22, on the kitchen K side. The vessel C in which the drink was poured is housed within each of these cabinets 22. The food and drink provider opens the door D3b of each of the cabinets 22, takes out the vessel C in which the drink was poured, and provides the drink to the food and drink recipient.

Further, a lock mechanism L capable of locking a door D1 (linked to the opening/closing door) of the entrance/exit between the room R1 and the passageway P is provided to the room R1. An operation button B (linked to the operation device and the visitor detector) and a display portion 30 (details described later) that displays various information are provided near the door D1 of the passageway P. The operation button B is a button provided in order to detect a visitor V who is attempting to enter the room R1, and is for the visitor V to instruct entry into the room R1. The lock mechanism L keeps the door D1 locked so that it cannot be opened from the passageway P side. The lock mechanism L is made so that it unlocks the door D1 when the visitor V operates the operation button B (linked to when an act of unlocking is performed), allowing the door D1 to be opened from the passageway P side. Note that, according to this embodiment, the door D1 can be opened from the room R1 side even when locked by the lock mechanism L.

A robot system 1 of this embodiment comprises the three robots 2a, 2b, and 2c (hereinafter suitably referred to as the "robots 2" when indicated without distinction), three robot controllers 3a, 3b, and 3c (hereinafter suitably referred to as the "robot controllers 3" when indicated without distinction), and a control PC 10. Note that the robot controllers 3a, 3b, and 3c and the control PC 10 are linked to the controller.

Figure 2:
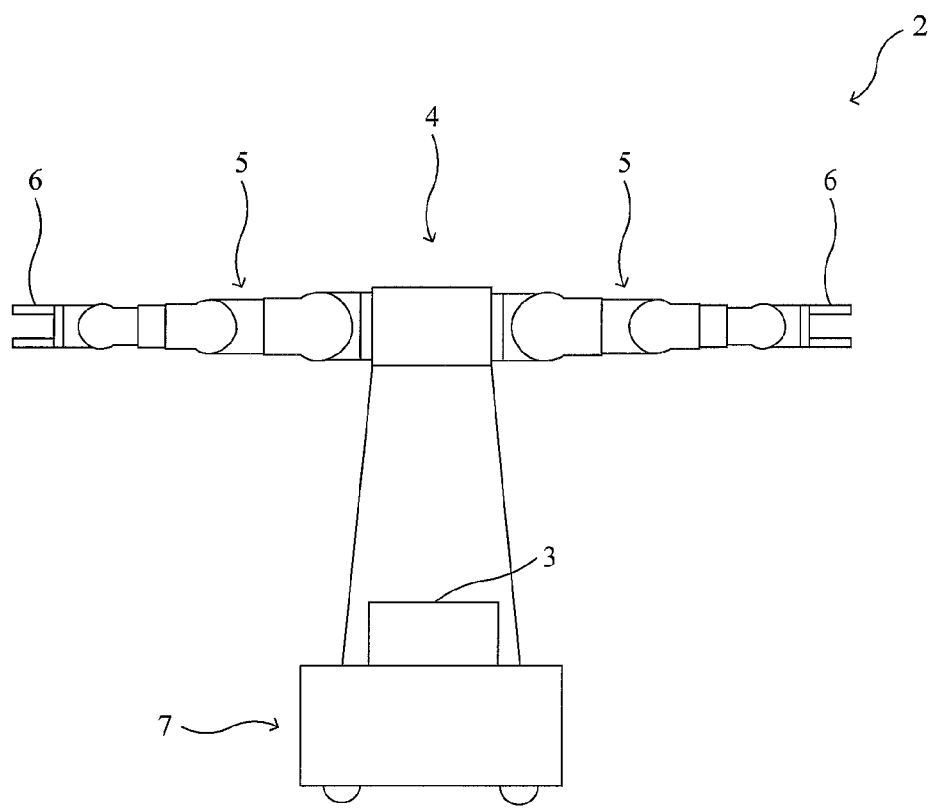
FIG. 2 is a schematic diagram schematically showing the configuration of the robot.

As shown in FIG. 2, each of the robots 2 comprises a robot main body 4 and an automated guided vehicle (AGV) 7 for movement without (or along) rails. Note that the AGV 7 is linked to the moving device. The robot main body 4 is a so-called vertically articulated robot, and provided on the AGV 7. This robot main body 4 comprises two arms 5 and 5. Various tools 6 are made to be installable to the end of each of these arms 5. According to the example shown in FIG. 2, a gripping device 6 capable of gripping various objects is installed as the tool 6 to the end of each of the arms 5.

Each of the robots 2 configured as described above performs drink pouring work (hereinafter suitably and simply abbreviated "work"), which is linked to the first work as well as the work that includes one or more steps, in the room R1. According to this work, each of the robots 2 operates the AGV 7 to execute movement, and suitably operates the arms 5 and the tools 6 to perform suitable operations (such as, for example, opening and closing the doors D2a and D3a of the cabinets 20 and 22, taking in and out the vessel C, pouring a drink into the vessel C, etc.; details described later). Note that the drink poured into the vessel C may be common to all of the robots 2a, 2b, and 2C. Or, the drink poured into the vessel C may be different for each of the robots 2, such as, for example, coffee for the robot 2a, tea for the robot 2b, and juice for the robot 2c. In such a case, the vessel C into which coffee was poured is housed within the cabinet 22 linked to the robot 2a, on the left side in the figure, for example. The vessel C into which tea was poured is housed within the cabinet 22 linked to the robot 2b, at the center in the figure, for example. The vessel C into which juice was poured is housed within the cabinet 22 linked to the robot 2c, on the right in the figure, for example.

Each of the robot controllers 3 is provided on the AGV 7 of each of the robots 2, and communicably connected to each of the robots 2. Each of the robot controllers 3 controls the operation of the robot main body 4 and the AGV 7 of the connected robots 2 in coordination. That is, as shown in FIG. 1, the robot controller 3a is provided on the AGV 7 of the robot 2a and connected to the robot 2a, controlling the operation of the robot main body 4 and the AGV 7 of the robot 2a in coordination. The robot controller 3b is provided on the AGV 7 of the robot 2b and connected to the robot 2b, controlling the operation of the robot main body 4 and the AGV 7 of the robot 2b in coordination. The robot controller 3c is provided on the AGV 7 of the robot 2c and connected to the robot 2c, controlling the operation of the robot main body 4 and the AGV 7 of the robot 2c in coordination.

The control PC 10 is communicably connected to the operation button B, the display portion 30, and the lock mechanism L, and communicably connected to each of the robot controllers 3a, 3b, and 3c. Then, the control PC 10 controls the operation button B, the display portion 30, and the lock mechanism L, as well as each of the robot controllers 3a, 3b, and 3c.

Figure 3A:
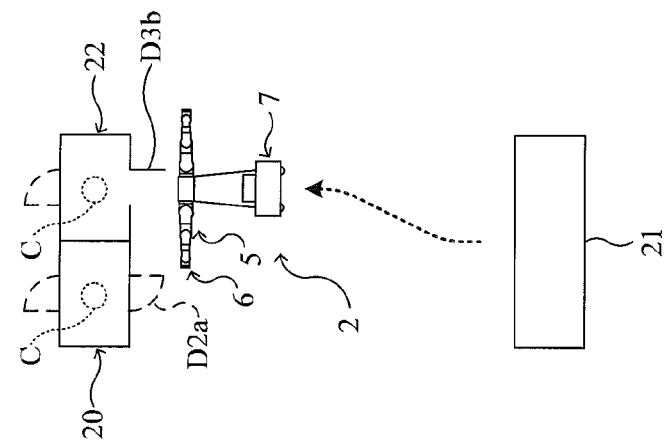
FIGS. 3A to 3C are explanatory views for explaining an example of the work performed by each robot.
Figure 3B:
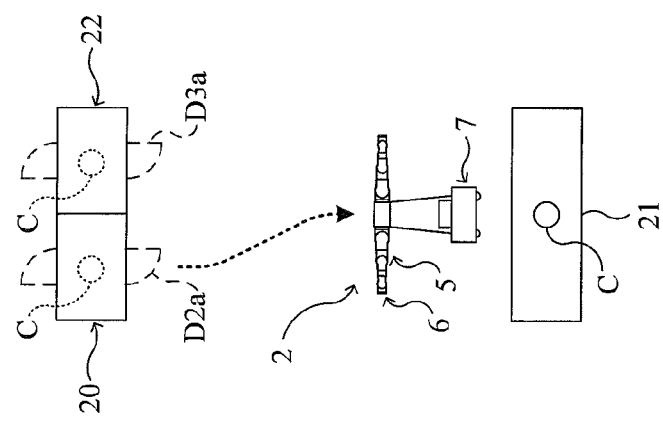
Figure 3C:
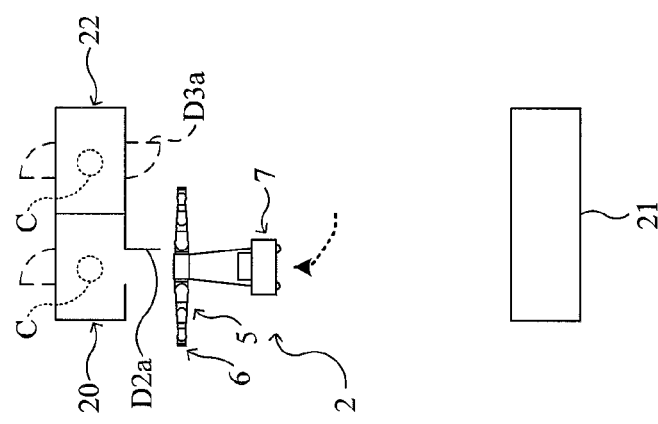

The following describes an example of the work performed by each of the robots 2, using FIGS. 3A to 3C.

In FIGS. 3A to 3C, the work performed by each of the robots 2 includes six predetermined steps. Each of the robots 2 performs these six steps consecutively in order to pour a drink into one of the vessels C. That is, first, the robot 2, as shown in FIG. 3A, operates the AGV 7 and moves to the front side of the cabinet 20 in step 1. Then, in step 2, the robot 2 suitably operates the arms 5 and the tools 6 to open the door D2a of the cabinet 20. Subsequently, the robot 2 grips and takes out the vessel C housed within the cabinet 20, and closes the door D2a.

Subsequently, as shown in FIG. 3B, in step 3, the robot 2 operates the AGV 7, grips the vessel C, and moves to a predetermined location near the work table 21. Then, in step 4, the robot 2 suitably operates the arms 5 and the tools 6 to place the gripped vessel C on the work table 21, and performs suitable processing to pour the drink into the vessel C.

Subsequently, as shown in FIG. 3C, in step 5, the robot 2 operates the AGV 7, grips the vessel C into which the drink was poured, and moves to the front side of the cabinet 22. Then, in step 6, the robot 2 suitably operates the arms 5 and the tools 6 to open the door D3a of the cabinet 22. Subsequently, the robot 2 puts the gripped vessel C into the cabinet 22 and closes the door D3a.

With the above, the work for one of the vessels C ends. Each of the robots 2 repeatedly executes the steps 1 to 6, continually putting the vessels C into which a drink was poured into the cabinet 22.

Here, the most special characteristic of this embodiment lies in the operation performed when the visitor V operates the operation button B when each of the robots 2a, 2b, and 2c performs the work (specifically, any of the steps 1 to 6) in the room R1. That is, in this case, each of the robots 2a, 2b, and 2c stops the operation executed up to that time after performing the work up to any predetermined stage including an intermediate stage of the step currently under execution, a successful completion stage of the step currently under execution, and a successful completion stage of another step after the step currently under execution. The following describes the details thereof.

Figure 4:
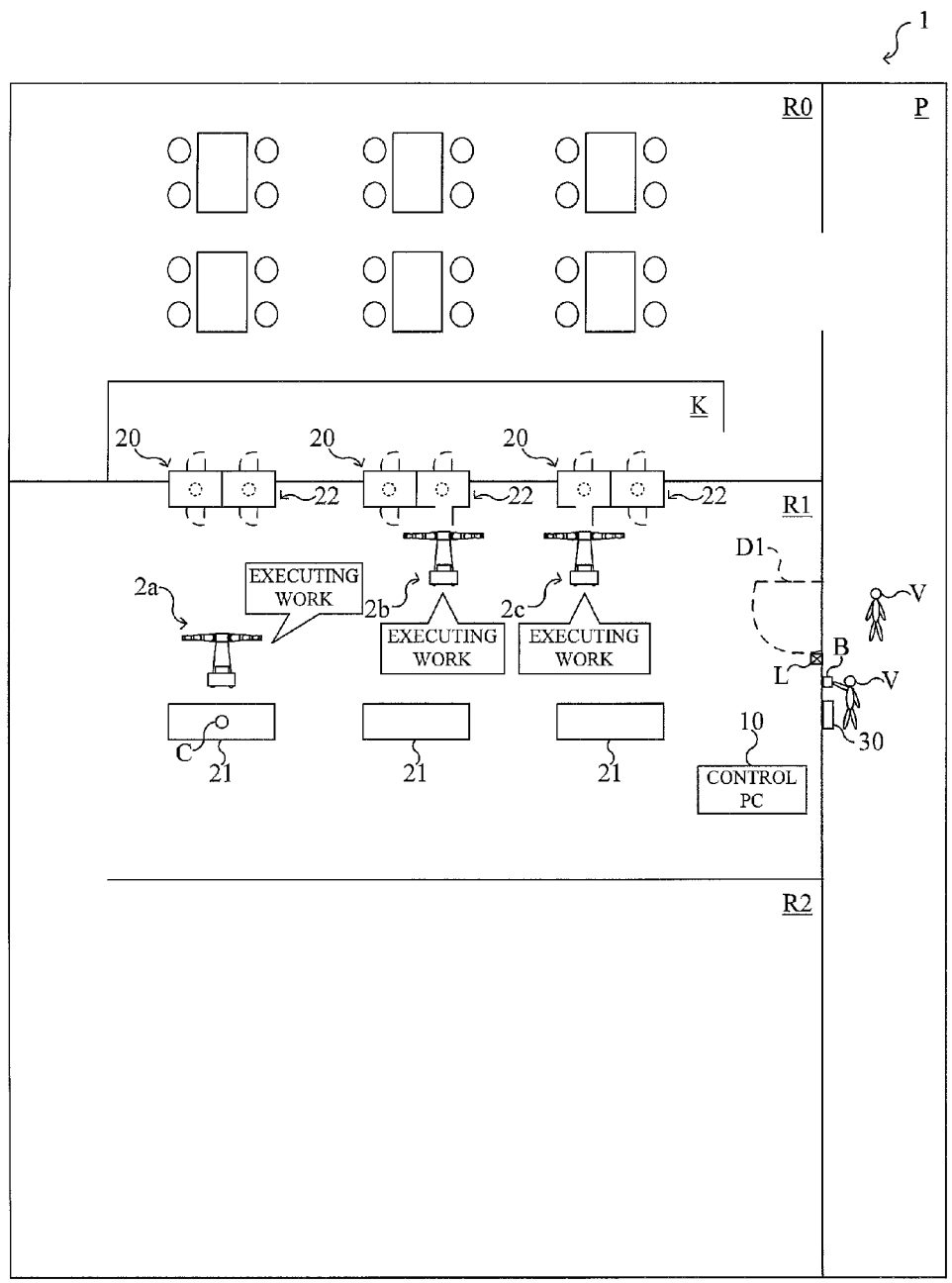
FIG. 4 is an explanatory view for explaining an example of the operation of each robot.

In FIGS. 4 to 9, the door D1 of the room R1 is always locked by the lock mechanism L so that a person cannot enter the room R1. FIG. 4 shows a state in which the visitors V attempting to enter the room R1 come and operate the operation button B when each of the robots 2a, 2b, and 2c is performing work in the room R1. According to the example shown in FIG. 4, there are two visitors V who have come. At this time, the robot 2a is performing the step 4, the robot 2b is performing the step 6, and the robot 2c is performing the step 2. Then, one of the visitors V operates the operation button B.

In this manner, when the visitor V operates the operation button B when each of the robots 2a, 2b, and 2c is performing work in the room R1, each of the robots 2a, 2b, and 2c needs to suspend work by, for example, stopping the operation executed up to that time in order to avoid contact with the visitors V who are entering the room R1. Nevertheless, there are stages in which inconveniences arise if the work performed by each of the robots 2a, 2b, and 2c is suspended at that point in time (in other words, stages that are not a good place to leave off). Stages that apply to such occurrence of inconvenience include the stage in which the door D2a or D3a of the cabinet 20 or 22 is open, the stage in which the vessel C is left outside the cabinet 20 or 22, or the like.

Here, according to this embodiment, when the visitor V operates the operation button B when each of the robots 2a, 2b, and 2c is performing work in the room R1, each of the robots 2a, 2b, and 2c performs work up to any predetermined stage including an intermediate stage of the step currently under execution, a successful completion stage of the step currently under execution, and a successful completion stage of another step after the step currently under execution. With this arrangement, each of the robots 2a, 2b, and 2c performs work up to a suspendable stage (in other words, a stage that is a good place to leave off) other than a stage such as one where the inconvenience arises. Note that, according to this embodiment, the stages in which the doors D2a and D3a of the cabinets 20 and 22 are not open and the vessel C is not left outside the cabinets 20 and 22 are set in advance as the suspendable stages. Specifically, for example, the suspendable stages include the intermediate stage of the step 1 (the stage of moving to the front side of the cabinet 20), the successful completion stage of the step 1 (the stage of completion of movement to the front side of the cabinet 20), the successful completion stage of the step 6 (the stage in which the door D3a of the cabinet 22 is closed), and the like. Then, after performing work up to a suspendable stage as described above, each of the robots 2a, 2b, and 2c, as an act of suspension, suspends work by stopping the operation executed up to that time. Note that, according to this embodiment, all of the robots 2a, 2b, and 2c are linked to the first robot as well as the predetermined robot. Further, in a case where the visitor V operates the operation button B as described above, the control PC 10 calculates the longest time until each of the robots 2a, 2b, and 2c suspends work (in other words, until the visitors V can enter the room R1). The calculated longest time is displayed on the display portion 30.

Figure 5:
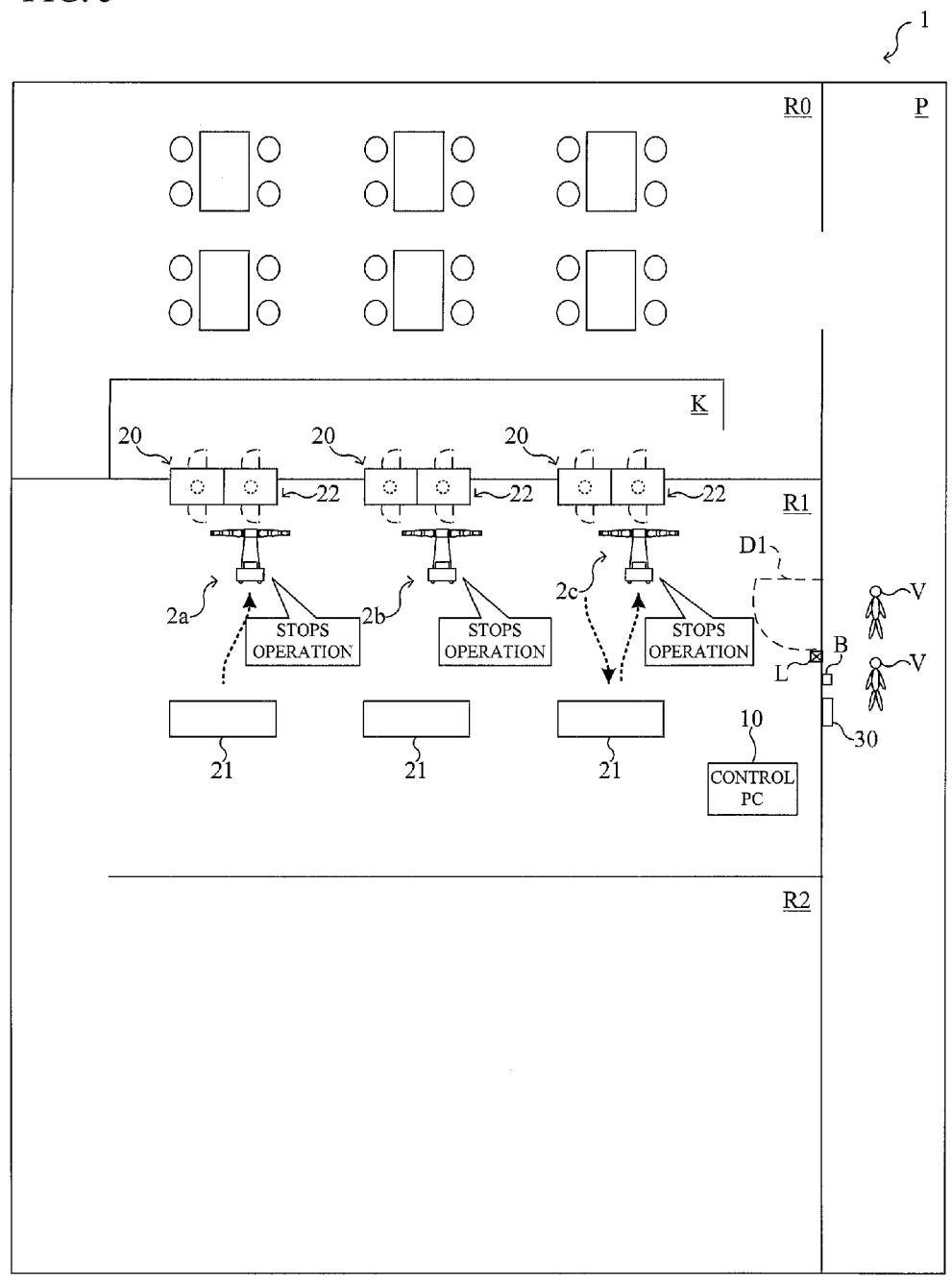
FIG. 5 is an explanatory view for explaining an example of the operation of each robot.

FIG. 5 shows a situation in which the visitor V operated the operation button B in the state shown in the FIG. 4, causing each of the robots 2a, 2b, and 2c to suspend work by stopping operation. According to the example shown in FIG. 5, since the operation button B was operated when the robot 2a was performing step 4, the robot 2a suspends work by stopping operation after performing the work from step 4 currently under execution, through step 5, to the stage of successful completion of step 6. The robot 2b, since the operation button B was operated when it was performing step 6, suspends work by stopping operation after performing the work up to the stage of successful completion of step 6 currently under execution. The robot 2c, since the operation button B was operated when it was performing step 2, suspends work by stopping operation after performing the work from step 2 currently under execution, through steps 3, 4, and 5, to the stage of successful completion of step 6.

Figure 6:
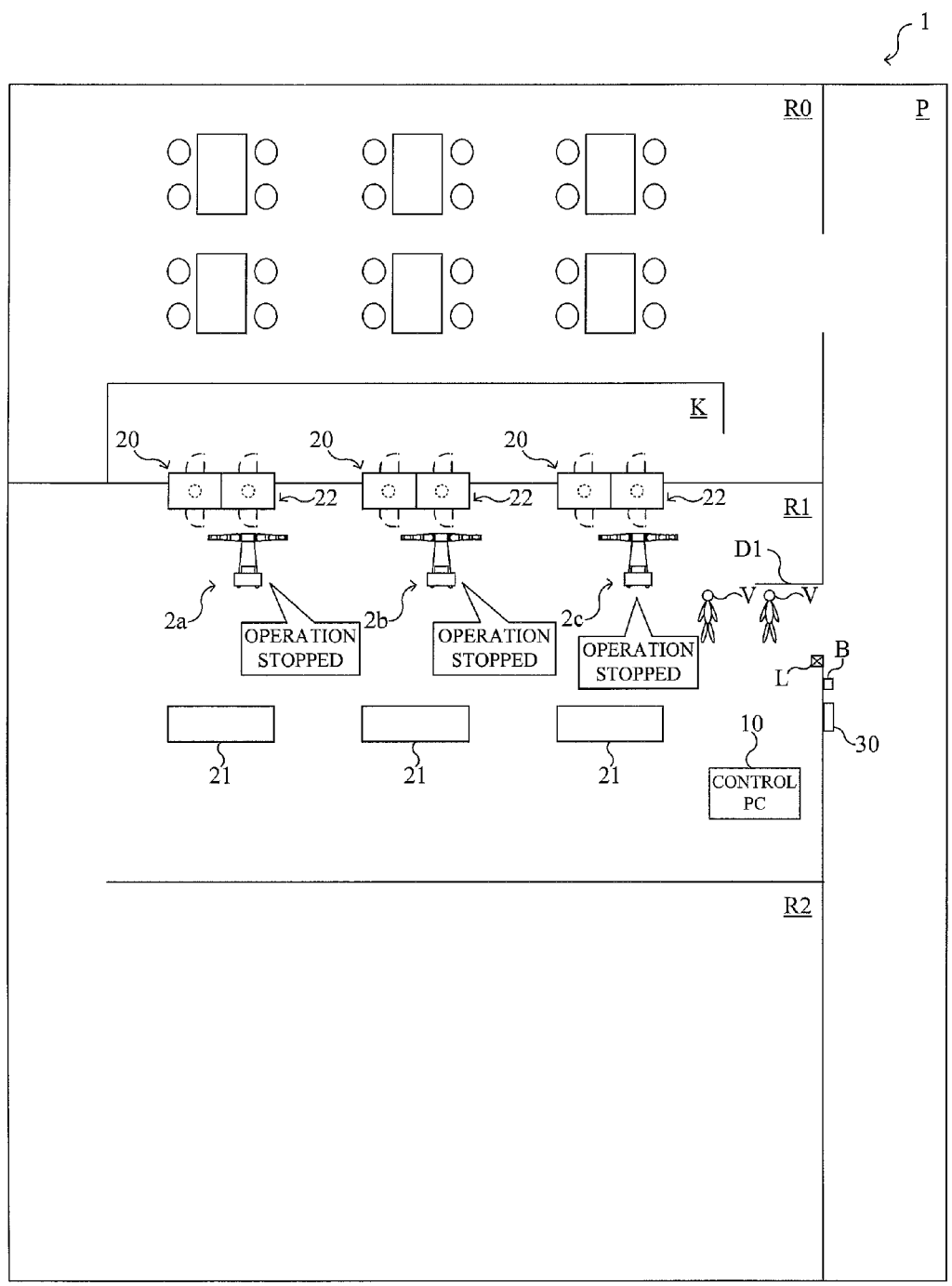
FIG. 6 is an explanatory view for explaining an example of the operation of each robot.
Figure 7:
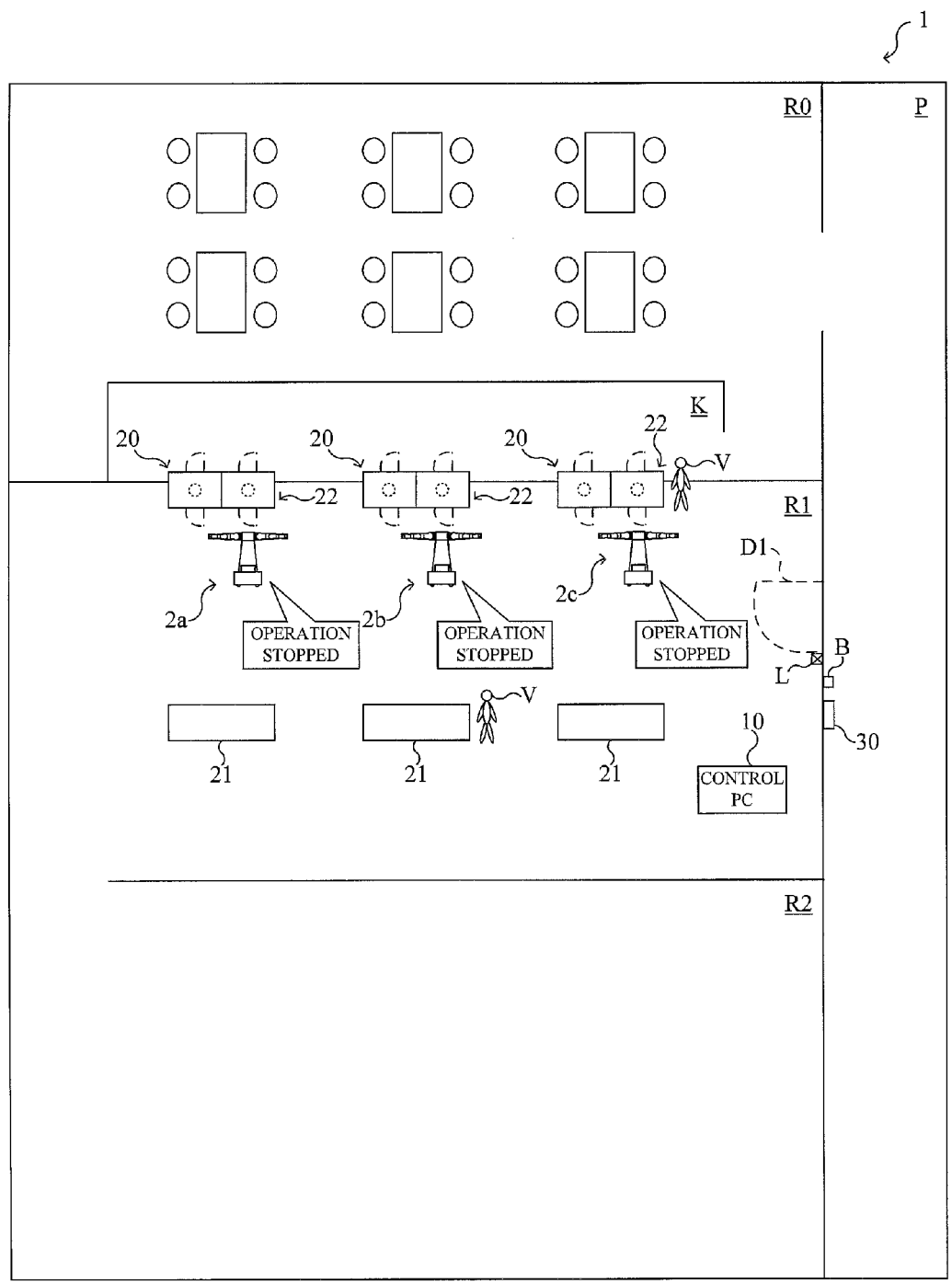
FIG. 7 is an explanatory view for explaining an example of the operation of each robot.
Figure 8:
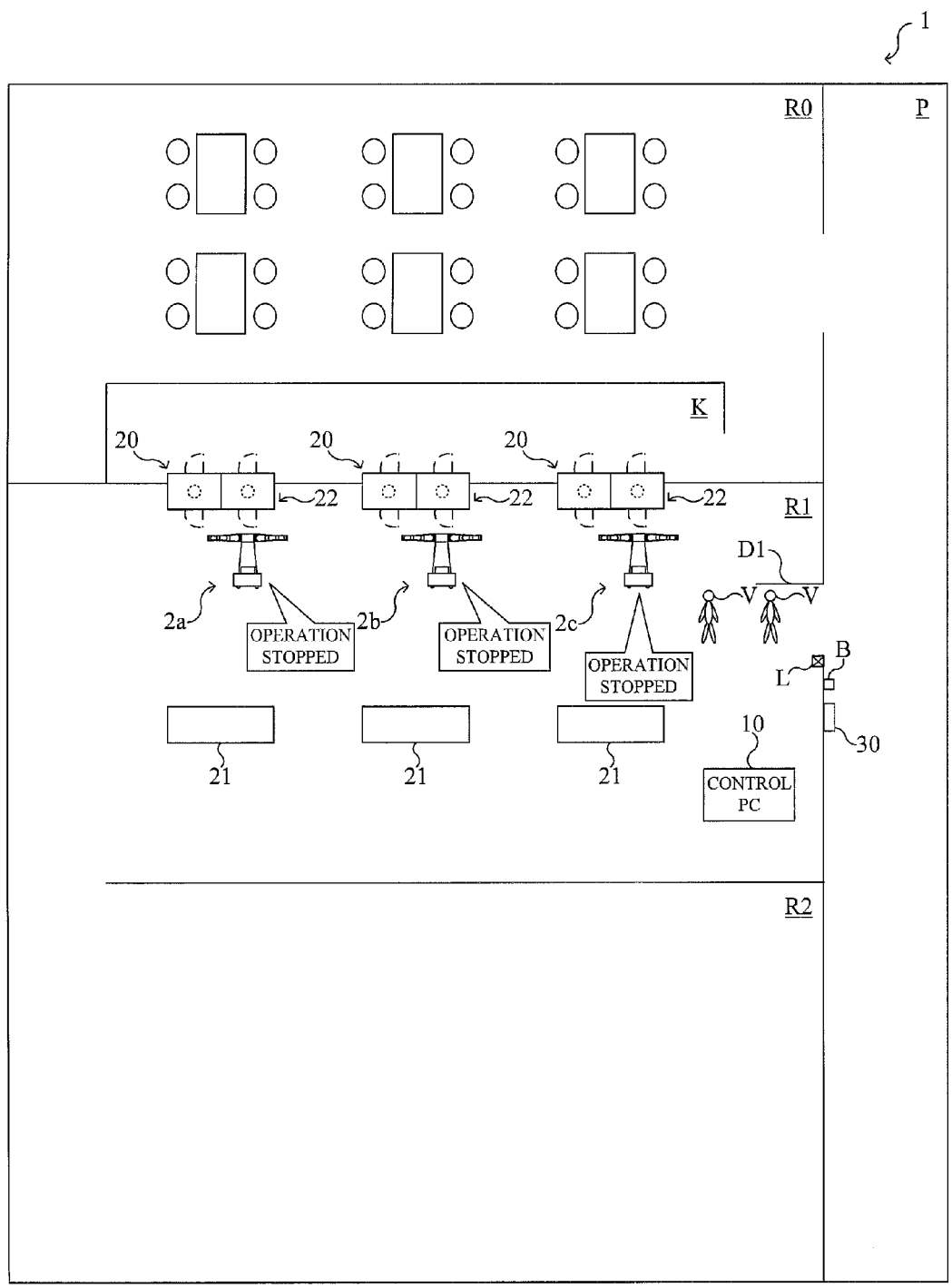
FIG. 8 is an explanatory view for explaining an example of the operation of each robot.
Figure 9:
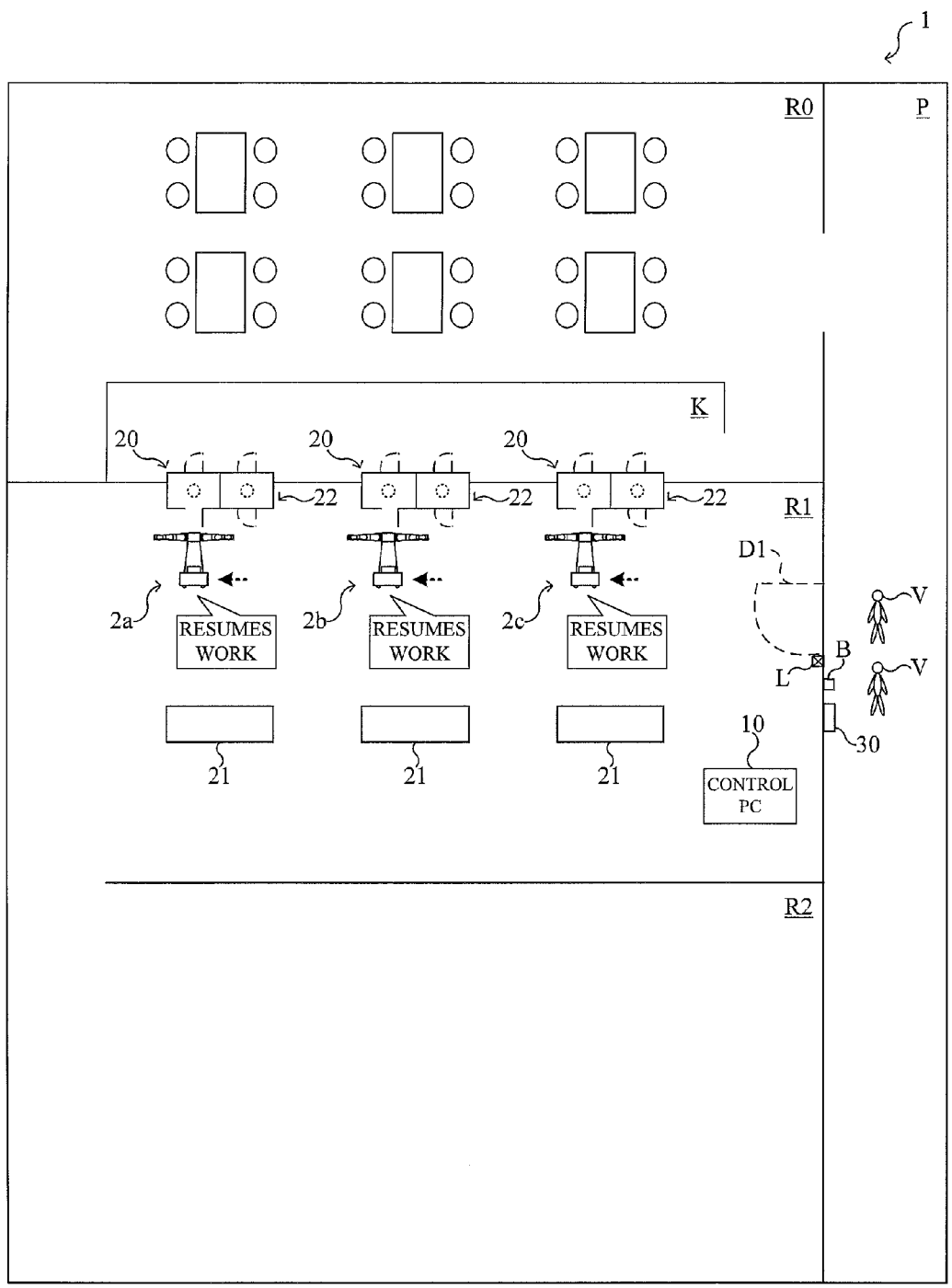
FIG. 9 is an explanatory view for explaining an example of the operation of each robot.

Then, once each of the robots 2a, 2b, and 2c suspends work by stopping operation, the lock mechanism L subsequently unlocks the door D1. With this arrangement, the state transitions to one in which the door D1 can be opened from the passageway P side, that is, to a state in which the visitors V can open the door D1 and enter the room R1. FIG. 6 shows a state in which the visitors V opened the door D1 and entered the room R1. As shown in FIG. 6, when the visitors V enter the room R1, each of the robots 2a, 2b, and 2c is in a state of stopped operation. FIG. 7 shows a state in which the visitors V perform maintenance on equipment within the room R1. As shown in FIG. 7, during the period in which the visitors V perform maintenance on equipment within the room R1, each of the robots 2a, 2b, and 2c is held in a state of stopped operation. FIG. 8 shows a state in which the visitors V have completed the maintenance and opened the door D1. As shown in FIG. 8, when the visitors V open the door D1 to depart from the room R1, each of the robots 2a, 2b, and 2c is still held in a state of stopped operation. Then, as shown in FIG. 9, when all of the visitors V depart from the room R1, each of the robots 2a, 2b, and 2c subsequently cancels the state of stopped operation and resumes work from the stage in which the work was suspended as previously described.

Figure 10:
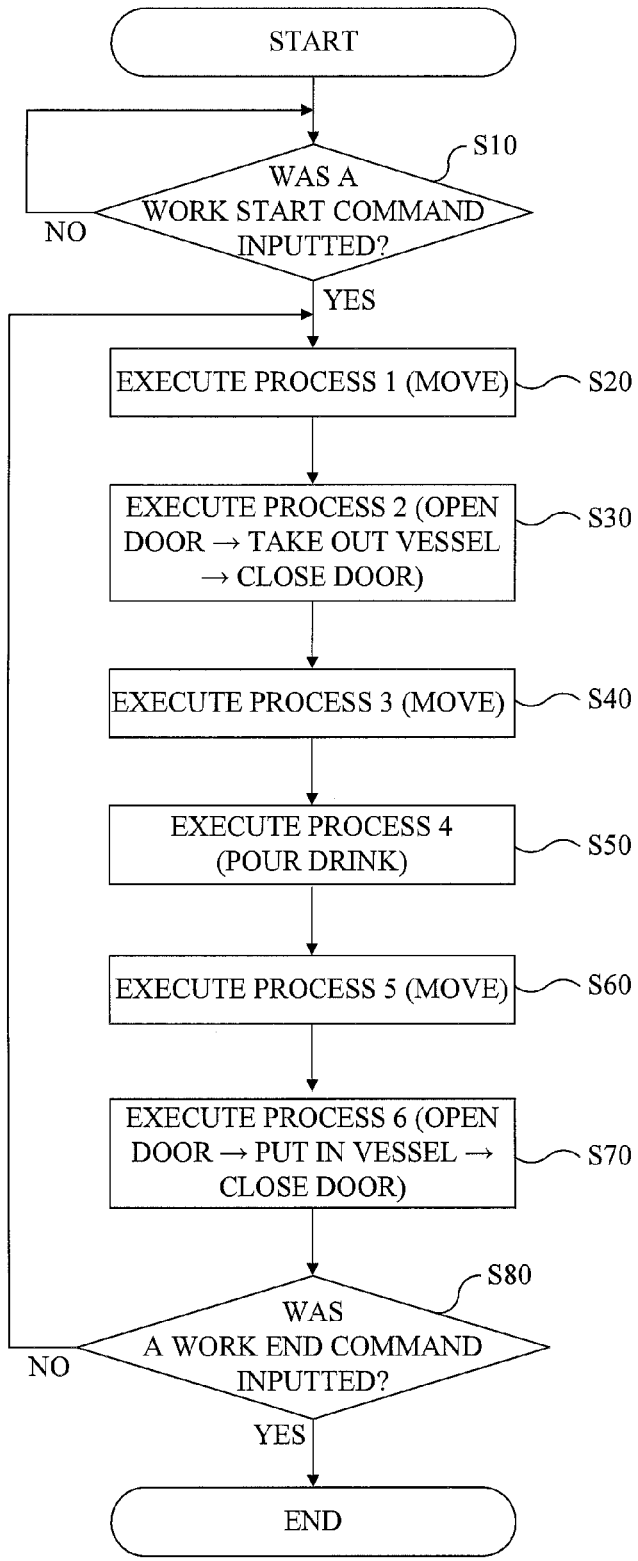
FIG. 10 is a flowchart showing an example of the control details executed by the robot controller.

The following describes an example of the control contents executed by each of the robot controllers 3a, 3b, and 3c via the control of the control PC 10, using FIG. 10.

In FIG. 10, the processing shown in the flow is started, for example, by a predetermined start operation (power ON by the robot controller 3, for example). First, in step S10, the robot controller 3 determines whether or not a work start command for starting work has been inputted from the control PC 10. Until the work start command is inputted, the decision is made that the condition of step S10 is not satisfied and the flow loops, entering a standby state. Once the work start command is inputted, the decision is made that the condition of step S10 is satisfied, and the flow proceeds to step S20.

In step S20, the robot controller 3 outputs a control signal to the linked robot 2, causing the robot 2 to execute the step 1. That is, the robot 2 operates the AGV 7 and moves to the front side of the cabinet 20.

Subsequently, in step S30, the robot controller 3 outputs a control signal to the linked robot 2, causing the robot 2 to execute the step 2. That is, the robot 2 suitably operates the arms 5 and the tools 6 and opens the door D2a of the cabinet 20. Then, the robot 2 grips and takes out the vessel C housed within the cabinet 20, and closes the door D2a.

Then, the flow proceeds to step S40 where the robot controller 3 outputs a control signal to the linked robot 2, causing the robot 2 to execute the step 3. That is, the robot 2 operates the AGV 7 and moves to a predetermined position near the work table 21 while gripping the vessel C.

Subsequently, in step S50, the robot controller 3 outputs a control signal to the linked robot 2, causing the robot 2 to execute the step 4. That is, the robot 2 suitably operates the arms 5 and the tools 6 to place the gripped vessel C on the work table 21, and performs suitable processing to pour the drink into the vessel C.

Then, the flow proceeds to step S60 where the robot controller 3 outputs a control signal to the linked robot 2, causing the robot 2 to execute the step 5. That is, the robot 2 operates the AGV 7, and moves to the front side of the cabinet 22 while gripping the vessel C in which the drink was poured.

Subsequently, in step S70, the robot controller 3 outputs a control signal to the linked robot 2, causing the robot 2 to execute the step 6. That is, the robot 2 suitably operates the arms 5 and the tools 6 and opens the door D3a of the cabinet 22. Then, the robot 2 puts the gripped vessel C into the cabinet 22 and closes the door D3a.

Then, the flow proceeds to step S80 where the robot controller 3 determines whether or not a work end command for ending work has been inputted from the control PC 10. Until the work end command is inputted, the decision is made that the condition of step S80 is not satisfied and the flow loops, entering a standby state. Once the work end command is inputted, the decision is made that the condition of step S80 is satisfied and the processing shown in this flow ends.

Note that the procedures of the steps S20, S30, S40, S50, S60, and S70 executed by each of the robot controllers 3a, 3b, and 3c are linked to the first work control portion as well as the work control means.

Figure 11:
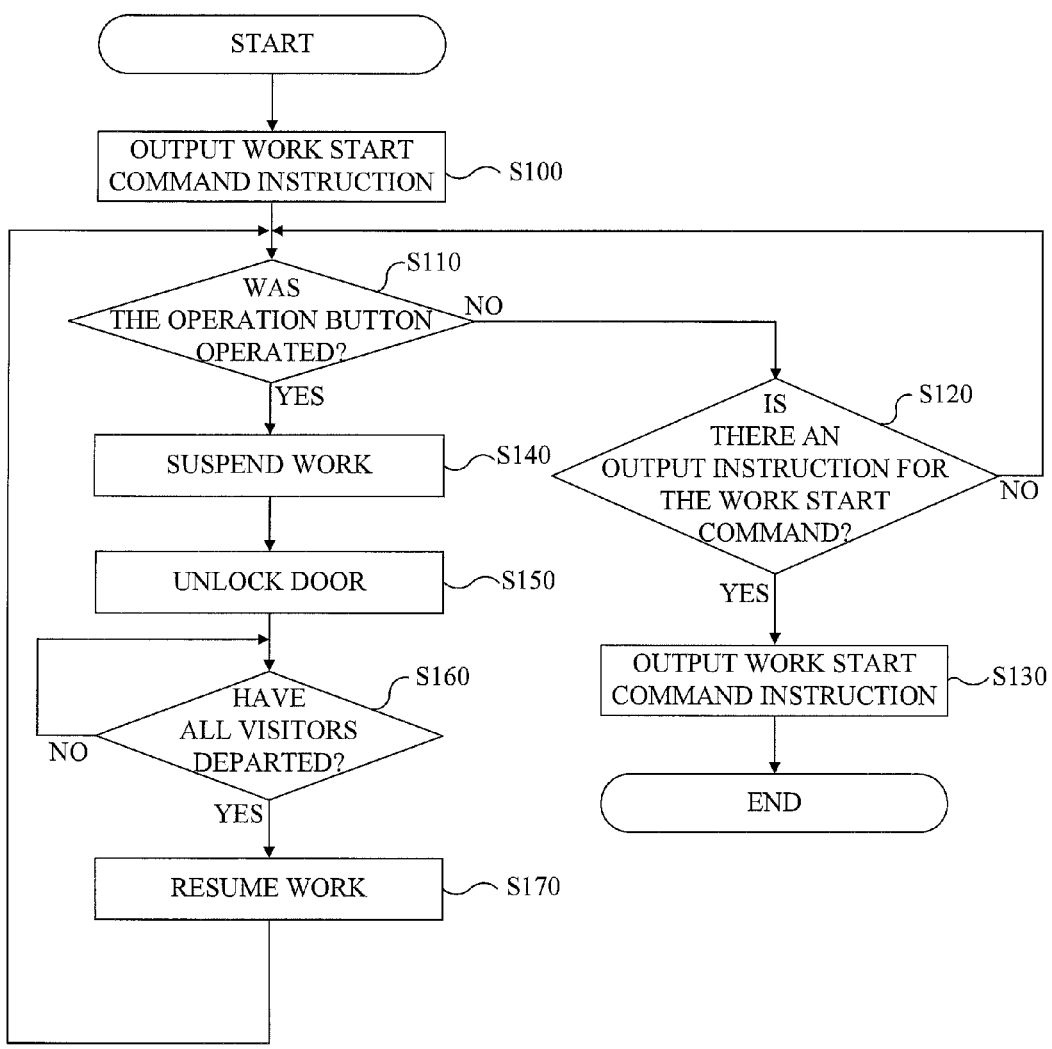
FIG. 11 is a flowchart showing an example of the control details executed by the control PC.

The following describes an example of the control details executed by the control PC 10 of this embodiment, using FIG. 11.

In FIG. 11, the processing shown in the flow is started by a predetermined start operation (power ON of the control PC 10, for example). First, in step S100, the control PC 10 outputs the work start command to each of the robot controllers 3a, 3b, and 3c. As a result, the decision is eventually made that the condition in step S10 of the FIG. 10 is satisfied, and work is started by each of the robots 2a, 2b, and 2c based on the control of each of the robot controllers 3a, 3b, and 3c.

Subsequently, in step S110, the control PC 10 determines whether or not the visitor V has operated the operation button B. Until the visitor V operates the operation button B, the decision is made that the condition of step S110 is not satisfied, and the flow proceeds to step S120.

In step S120, the control PC 10 determines whether or not an output instruction for the work end command was made via a suitable input device, for example. In a case where an output instruction for the work end command has not been made, the decision is made that the condition of step S120 is not satisfied, the flow returns to the step S110, and the same procedure is repeated. On the other hand, in a case where an output instruction for the work end command has been made, the decision is made that the condition of step S120 is satisfied, and the flow proceeds to step S130.

In step S130, the control PC 10 outputs the work end command to each of the robot controllers 3a, 3b, and 3c. As a result, the decision is eventually made that the condition of step S80 of the FIG. 10 is satisfied, and work is ended by each of the robots 2a, 2b, and 2c based on the control by each of the robot controllers 3a, 3b, and 3c. Subsequently, the processing shown in this flow ends.

On the other hand, in a case where the visitor V has operated the operation button B in the step S110 (in other words, the visitor V is detected by the operation button B), the decision is made that the condition of step S110 is satisfied and the flow proceeds to step S140.

In step S140, the control PC 10 outputs a control signal for suspending work (a control signal for controlling the robot 2 so that the robot 2 stops the operation executed up to that time after performing work up to the suspendable stage) to each of the robot controllers 3a, 3b, and 3c. Then, each of the robot controllers 3a, 3b, and 3c that received this control signal controls the linked robot 2 so that the robot 2 stops the operation executed up to that time after performing work up to the suspendable stage. As a result, the work by each of the robots 2a, 2b, and 2c is suspended. The procedure of this step S140 and the procedure of controlling the robot 2 that is executed by each of the robot controllers 3a, 3b, and 3c as described above are linked to the first suspension control portion as well as the suspension control means.

Then, the flow proceeds to step S150 where the control PC 10 controls the lock mechanism L so that the door D1 is unlocked. As a result, the state transitions to one in which the door D1 can be opened from the passageway P side, that is, to a state in which the visitors V can open the door D1 and enter the room R1. The procedure of this step S150 is linked to the lock control portion.

Subsequently, in step S160, the control PC 10 determines whether or not all of the visitors V who have entered the room R1 have departed from the room R1 while detecting the departure of the visitors V from the room R1 by suitable known means. The procedure of this step S160 is linked to the departure detecting portion. Until all of the visitors V have departed from the room R1, the decision is made that the condition of step S160 is not satisfied and the flow loops, entering a standby state. Once all of the visitors V have departed from the room R1, the decision is made that the condition of step S160 is satisfied and the flow proceeds to step S170.

In step S170, the control PC 10 outputs a control signal to each of the robot controllers 3a, 3b, and 3c for controlling the robot 2 so that the robot 2 cancels the state of stopped operation. Then, each of the robot controllers 3a, 3b, and 3c that received this control signal controls the linked robot 2, cancelling the state of stopped operation. As a result, the work by each of the robots 2a, 2b, and 2c is resumed from the suspended stage. The procedure of this step S170 and the procedure of controlling the robot 2 that is executed by each of the robot controllers 3a, 3b, and 3c as described above are linked to the first resumption control portion.

As described above, in the robot system 1 of this embodiment, each of the robots 2a, 2b, and 2c performs drink pouring work in the room R1. Then, in a case where the visitor V operates the operation button B when each of the robots 2a, 2b, and 2c is performing work in the room R1, each of the robots 2a, 2b, and 2c stops the operation executed up until that time. With this arrangement, the operation of each of the robots 2a, 2b, and 2c changes to a state of stopped operation within the room R1. As a result, contact between the visitors V who enter the room R1 and each of the robots 2a, 2b, and 2c can be prevented, and the safety of the visitors V can be ensured.

At this time, there are stages in which inconveniences arise if the work performed by each of the robots 2a, 2b, and 2c is suspended at that point in time. In a case where work is suspended at such a stage, the work cannot always be resumed from the point in time that the work was suspended, even if each of the robots 2a, 2b, and 2c subsequently transitions to a state in which work can be resumed. In such a case, the work performed up to the intermediate stage is wasted, resulting in the problem of decreased productivity.

Here, in this embodiment, in a case where the visitor V attempting to enter the room R1 operates the operation button B, an operation such as described above is not immediately stopped and work by each of the robots 2a, 2b, and 2c is not immediately suspended, but rather work is performed up to the suspendable stage. Subsequently, the operation is stopped in a manner as described above, and the work by each of the robots 2a, 2b, and 2c is suspended. With this arrangement, in a case where the state changes to one in which each of the robots 2*a*, 2*b*, and 2*c* can resume work as described above, the work can be resumed from the point in time in which the work was suspended, without wasting any work performed up to an intermediate stage.

As described above, according to this embodiment, it is possible to improve productivity while ensuring the safety of the visitor V.

Further, in particular, according to this embodiment, the door D1 is provided to the entrance/exit of the room R1, and the control PC 10 controls the lock mechanism L capable of locking the door D1. With this arrangement, entry by the visitors V into the room R1 can be restricted, and security and safety can be ensured. Then, in a case where the visitor V operates the operation button B, the lock mechanism L unlocks the door D1 after the work by each of the robots 2*a*, 2*b*, and 2*c* has been suspended as described above by the control of the control PC 10. In this manner, according to this embodiment, the visitors V can enter the room R1 after the work by each of the robots 2*a*, 2*b*, and 2*c* is suspended. With this arrangement, it is possible to prevent the visitors V from entering the room R1 before the work by each of the robots 2*a*, 2*b*, and 2*c* is suspended. As a result, contact between the visitors V who enter the room R1 and each of the robots 2*a*, 2*b*, and 2*c* can be reliably prevented.

Further, in particular, according to this embodiment, each of the robots 2*a*, 2*b*, and 2*c* stops the operation executed up until that time after performing work to the suspendable stage as described above. With this arrangement, the operation of each of the robots 2*a*, 2*b*, and 2*c* can be changed to a state of stopped operation within the room R1. As a result, contact between the visitors V who enter the room R1 and each of the robots 2*a*, 2*b*, and 2*c* can be prevented.

Further, in particular, according to this embodiment, the visitors V attempting to enter the room R1 are detected by the operation of the operation button B. As a result, it is possible to detect entry into the room R1 based on the intention of the visitors V. With this arrangement, it is possible to avoid the defect of erroneous detection of a person passing near the door D1 in the passageway P as the visitor V. Further, it is possible to also avoid the defect of the visitor V entering the room R1 as is without detection of the visitor V coming to the door D1 (with each of the robots 2*a*, 2*b*, and 2*c* still performing work as is). As a result, reliability can be increased.

Further, in particular, according to this embodiment, the departure of the visitors V from the room R1 is detected. Then, when the work by each of the robots 2*a*, 2*b*, and 2*c* is suspended as previously described and the departure of all of the visitors V is detected, the state of stopped operation of each of the robots 2*a*, 2*b*, and 2*c* is cancelled and the work by each of the robots 2*a*, 2*b*, and 2*c* is resumed. With this arrangement, at the point in time that all of the visitors V who entered the room R1 depart, the suspended work by each of the robots 2*a*, 2*b*, and 2*c* can be resumed. Accordingly, it is possible to avoid defects such as the resumption of work by each of the robots 2*a*, 2*b*, and 2*c* when the visitors V are still in the room R1, or the non-resumption of work by each of the robots 2*a*, 2*b*, and 2*c* even though the visitors V are no longer in the room R1.

Note that the embodiments are not limited to the above, and various modifications may be made without deviating from the spirit and scope of the disclosure. The following describes such modifications one by one.

(1) When Each of the Robots Moves to a Corner of the Room and Waits

While each of the robots 2*a*, 2*b*, and 2*c* stopped operation when the visitor V operated the operation button B in the embodiment, the present disclosure is not limited to such a form. That is, each of the robots 2*a*, 2*b*, and 2*c* may move to a corner of the room R1 and wait in the corner.

Figure 12:
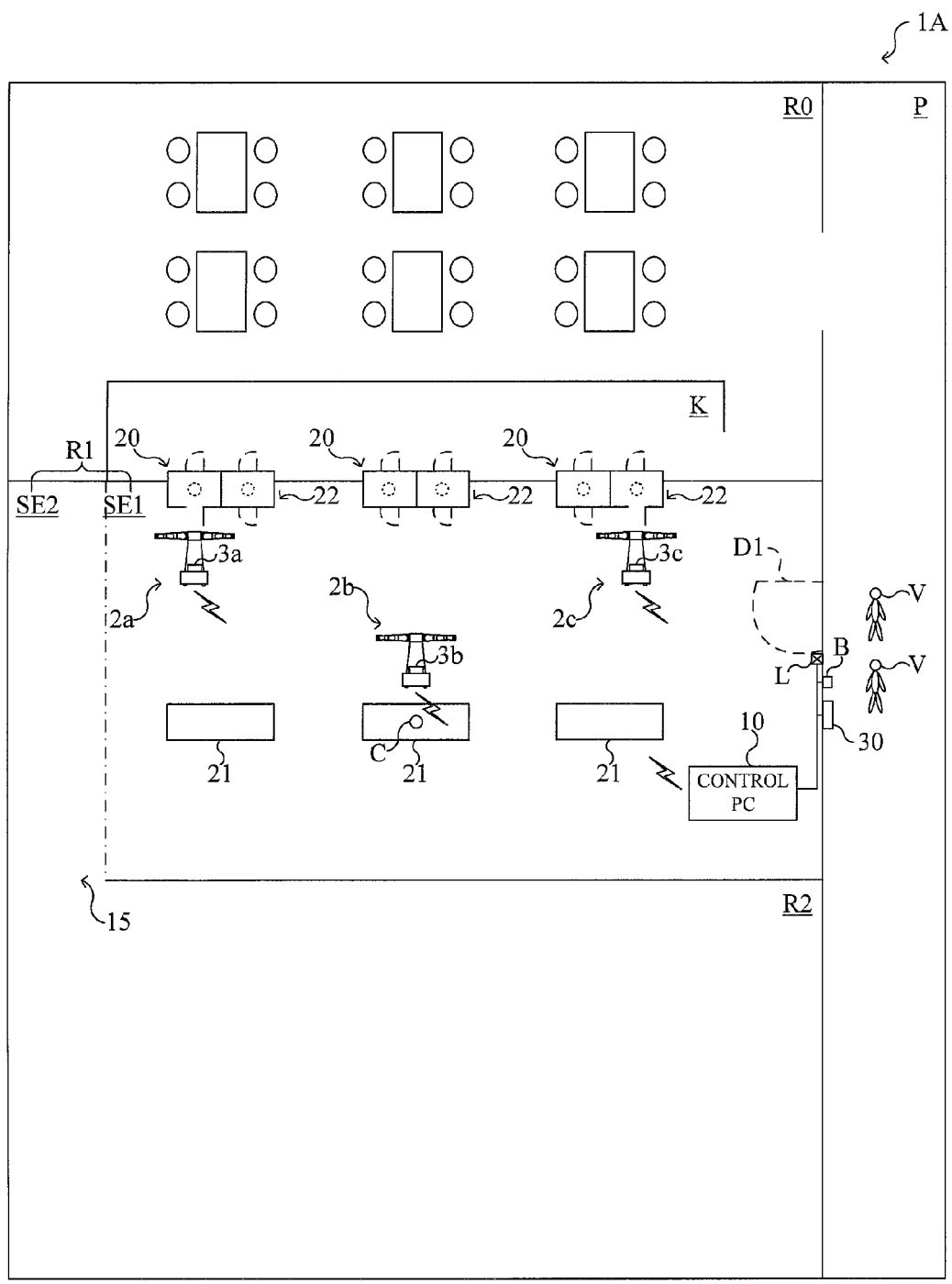
FIG. 12 is a system configuration diagram schematically showing the overall configuration of the robot system of a modification wherein each robot moves to a corner of a room and waits.

As shown in FIG. 12, in this modification, the room R1 is divided into a section SE1 that occupies the major portion of the room R1, and a section SE2 that is provided in a corner of the room R1. Note that, according to this modification, the section SE1 of the room R1 is linked to the first area as well as the area where entry is restricted, and the section SE2 of the room R1 is linked to the second area. The door D1 is provided to the section SE1 side. The three sets of the cabinet 20, the work table 21, and the cabinet 22 are provided to the section SE1 side.

A robot system 1A of this modification has the same configuration as the robot system 1. That is, the robot system 1A comprises the three robots 2*a*, 2*b*, and 2*c*, the three robot controllers 3*a*, 3*b*, and 3*c*, and the control PC 10.

Figure 13:
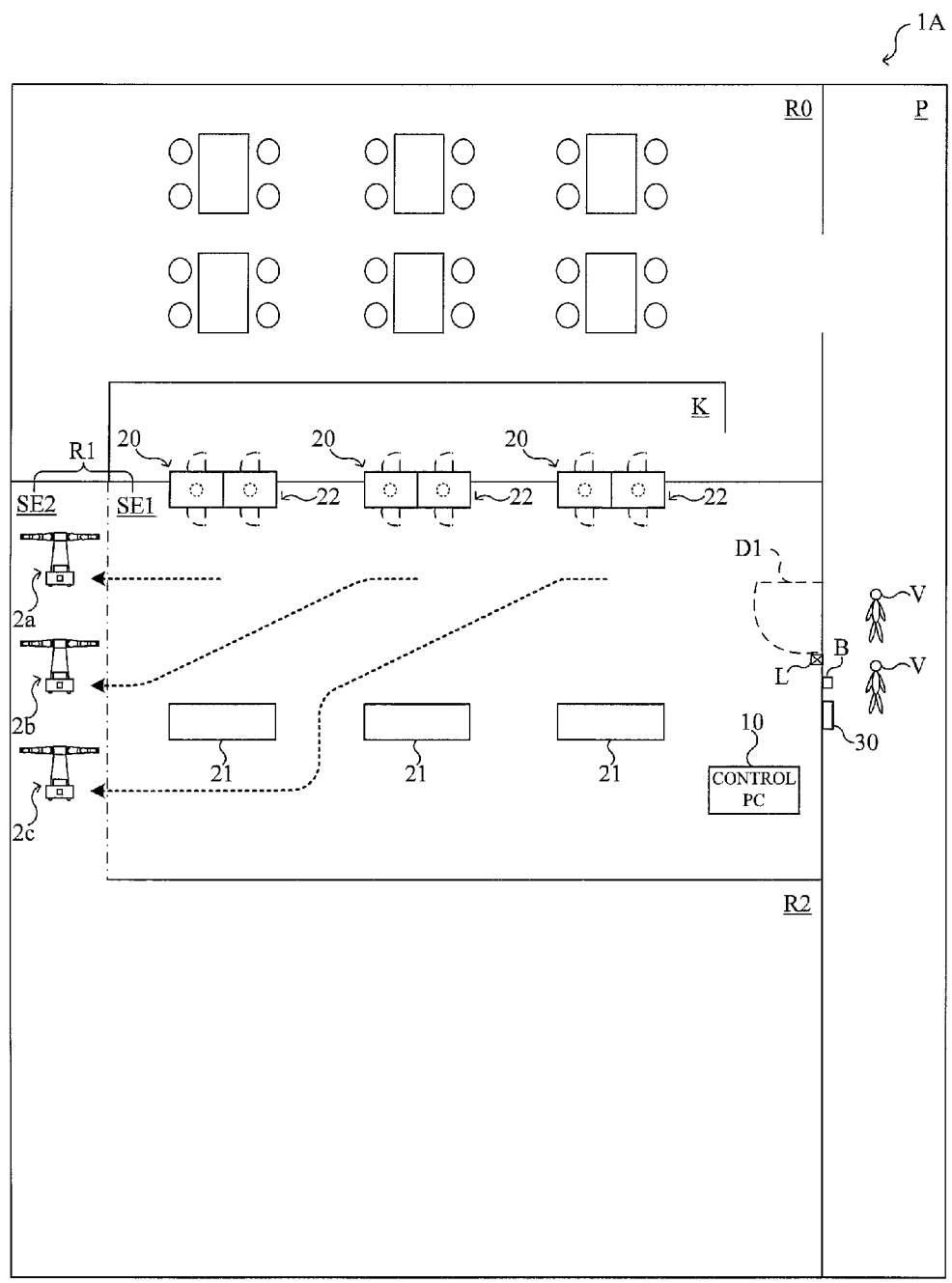
FIG. 13 is an explanatory view for explaining an example of the operation of each robot.

According to this modification, each of the robots 2*a*, 2*b*, and 2*c* performs the drink pouring work in the section SE1 of the room R1. Then, when the visitor V operates the operation button B when work (specifically, any of the steps 1 to 6) is being performed in the section SE1 by each of the robots 2*a*, 2*b*, and 2*c*, each of the robots 2*a*, 2*b*, and 2*c* performs work up to the suspendable stage. Subsequently, as shown in FIG. 13, each of the robots 2*a*, 2*b*, and 2*c*, as an act of suspension, operates the AGV 7, moves to the section SE2 of the room R1, waits in the section SE2, and suspends work. Note that, according to this modification as well, all of the robots 2*a*, 2*b*, and 2*c* are linked to the first robot as well as the predetermined robot.

Figure 14:
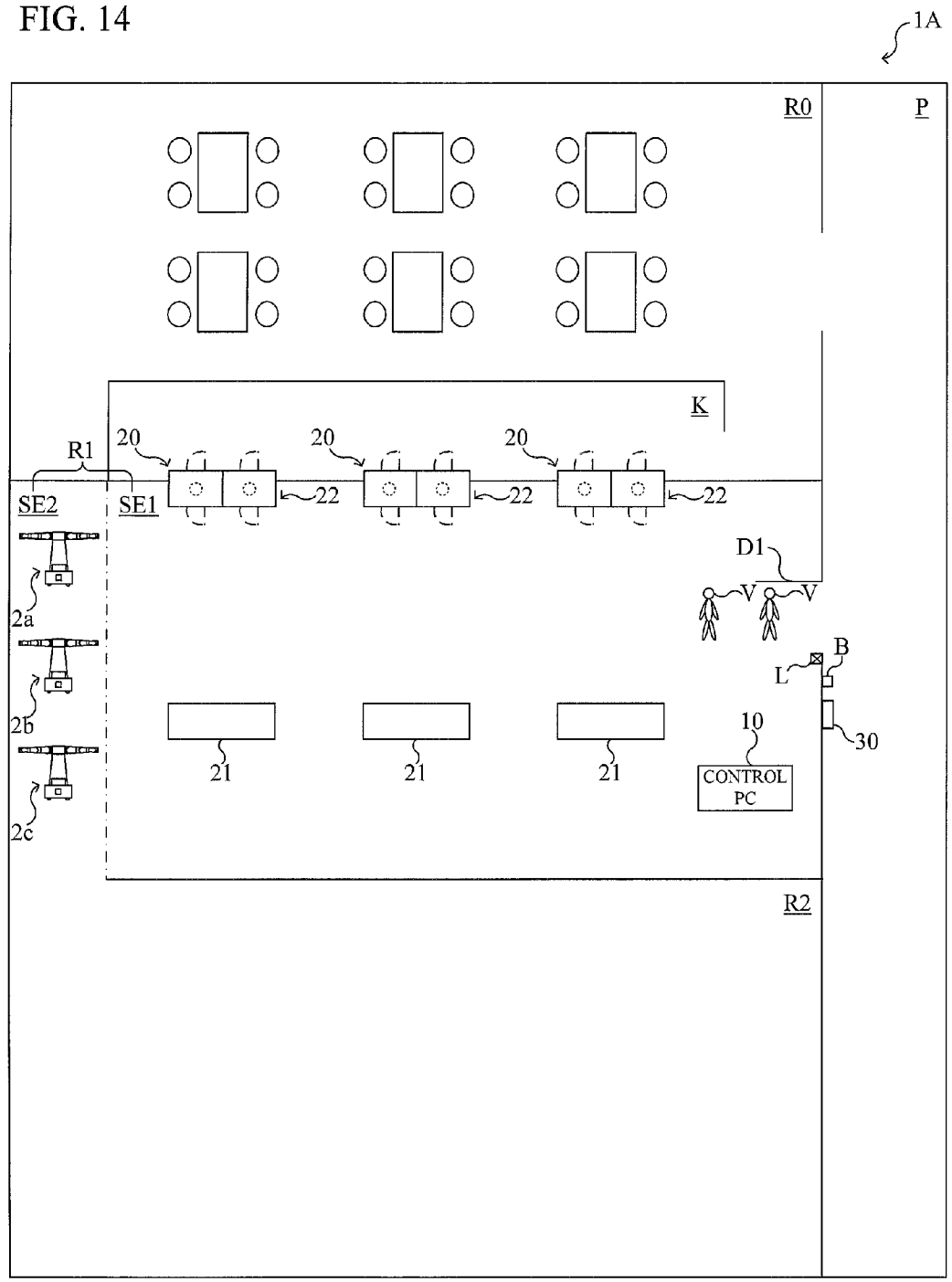
FIG. 14 is an explanatory view for explaining an example of the operation of each robot.

Then, when each of the robots 2*a*, 2*b*, and 2*c* moves to the section SE2 and suspends work, the lock mechanism L subsequently unlocks the door D1. As a result, the visitors V can open the door D1 and enter the room R1. FIG. 14 shows a state in which the visitors V opened the door D1 and entered the section SE1 of the room R1. As shown in FIG. 14, when the visitors V enter the section SE1 of the room R1, each of the robots 2*a*, 2*b*, and 2*c* is in a state of waiting in the section SE2. Then, when all of the visitors V depart from the room R1, each of the robots 2*a*, 2*b*, and 2*c* that moved to and waited in the section SE2 subsequently operates the AGV 7, returns to its position in the section SE1 prior to suspension, and resumes work from the stage where the work was suspended as previously described.

Figure 15:
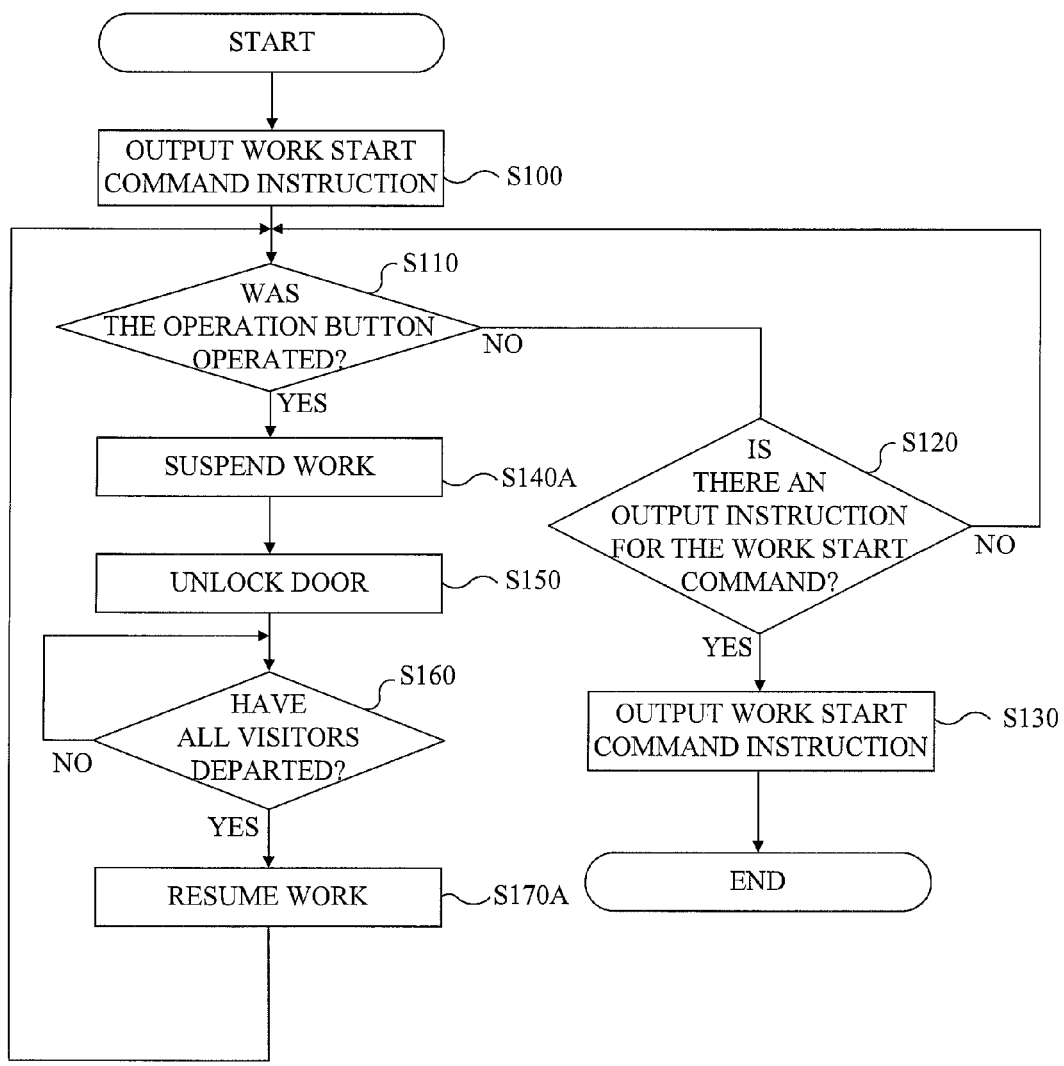
FIG. 15 is a flowchart showing an example of the control details executed by the control PC.

The following describes an example of the control details executed by the control PC 10 of this modification, using FIG. 15. Note that this FIG. 15 is linked to the FIG. 11, the same procedures as those in FIG. 11 are denoted using the same reference numerals, and descriptions thereof are suitably omitted or simplified.

In FIG. 15, the difference from the FIG. 11 lies in that the steps S140A and S170A are provided in place of steps S140 and S170. That is, the steps S100 to S130 are the same as those in the FIG. 11 and, when the visitor V operates the operation button B, the decision is made that the condition of step S110 is satisfied, and the flow proceeds to step S140A provided in place of step S140.

In step S140A, the control PC 10 outputs a control signal for work suspension and movement (a control signal for controlling the AGV 7 of the robot 2 so that, once work is performed up to the suspendable stage, the robot 2 moves to the section SE2 and waits) to each of the robot controllers 3*a*, 3*b*, and 3*c*. Then, each of the robot controllers 3*a*, 3*b*, and 3*c* that received this control signal controls the AGV 7 of the linked robot 2 so that, once work is performed up to the suspendable stage, the robot 2 moves to the section SE2 and waits. As a result, the work by each of the robots 2*a*, 2*b*, and 2c is suspended. The procedure of this step S140A and the procedure of controlling the AGV 7 of the robot 2 that is executed by each of the robot controllers 3a, 3b, and 3c as described above are linked to the first suspension control portion as well as the suspension control means.

The subsequent steps S150 to S160 are the same as those in the FIG. 11. That is, once all of the visitors V have departed from the room R1, the decision is made that the condition of step S160 is satisfied and the flow proceeds to step S170A provided in place of step S170.

In step S170A, the control PC 10 outputs a control signal for position recovery (a control signal for controlling the AGV 7 of the robot 2 so that the robot 2 returns to its position prior to suspension in the section SE1) to each of the robot controllers 3a, 3b, and 3c. Then, each of the robot controllers 3a, 3b, and 3c that received this control signal controls the AGV 7 of the linked robot 2, causing the robot 2 to return to its position prior to suspension in the section SE1. With this arrangement, each of the robots 2a, 2b, and 2c that moved to and was waiting in the section SE2 returns to its position prior to suspension in the section SE1. Then, each of the robots 2a, 2b, and 2c resumes work from the suspended stage. The procedure of this step S170A and the procedure of controlling the robot 2 that is executed by each of the robot controllers 3a, 3b, and 3c as described above are linked to the first resumption control portion.

In this modification described above, each of the robots 2a, 2b, and 2c operates the AGV 7 and moves to the section SE2 upon performing work to a suspendable stage as previously described. With this arrangement, it is possible to transition to a state in which none of the robots 2a, 2b, and 2c exists within the section SE1. As a result, contact between the visitors V who enter the section SE1 and each of the robots 2a, 2b, and 2c can be prevented.

(2) When Each of the Robots Moves to a Separate Room to Perform Work

While each of the robots 2a, 2b, and 2c stopped operation when the visitor V operated the operation button B in the previous modification, the present disclosure is not limited to such a form. That is, when the visitor V operates the operation button B, each of the robots 2a, 2b, and 2c may move from the room R1 to the room R2 and perform predetermined work in the room R2. Note that, according to this modification, the entire room R1 is linked to the first area as well as the area where entry is restricted, and the entire room R2 is linked to the second area.

Figure 16:
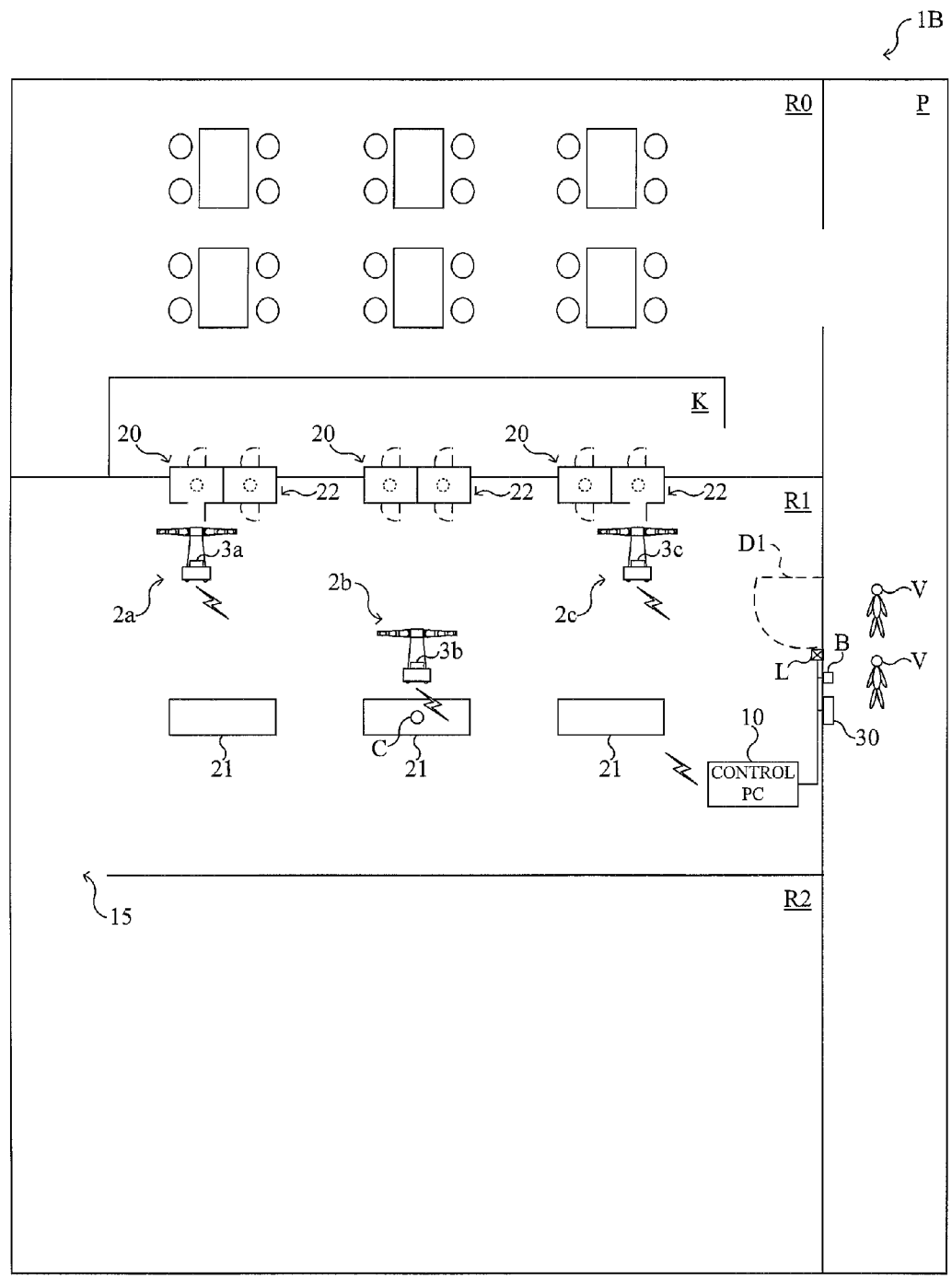
FIG. 16 is a system configuration diagram schematically showing the overall configuration of the robot system of a modification wherein each robot moves to another room and performs work.

As shown in FIG. 16, a robot system 1B of this modification has the same configuration as the robot system 1. That is, the robot system 1B comprises the three robots 2a, 2b, and 2c, the three robot controllers 3a, 3b, and 3c, and the control PC 10.

Figure 17:
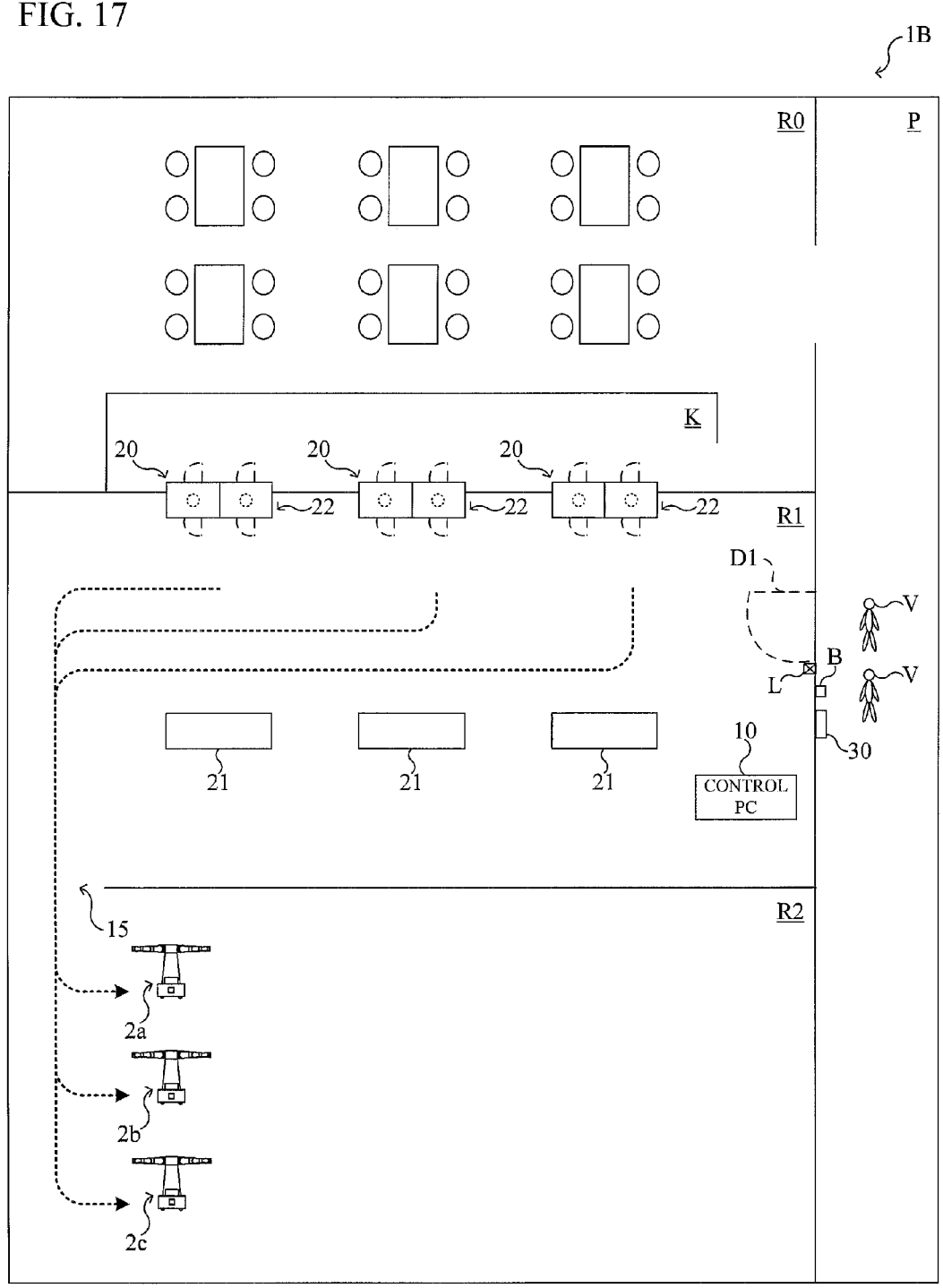
FIG. 17 is an explanatory view for explaining an example of the operation of each robot.

According to this modification, each of the robots 2a, 2b, and 2c performs the drink pouring work in the room R1. Then, when the visitor V operates the operation button B when work (specifically, any of the steps 1 to 6) is being performed in the room R1 by each of the robots 2a, 2b, and 2c, each of the robots 2a, 2b, and 2c performs work up to the suspendable stage. Subsequently, as shown in FIG. 17, each of the robots 2a, 2b, and 2c, as an act of suspension, operates the AGV 7, moves to the room R2 via the walkway 15, and suspends work. Note that, according to this modification as well, all of the robots 2a, 2b, and 2c are linked to the first robot as well as the predetermined robot.

Figure 18:
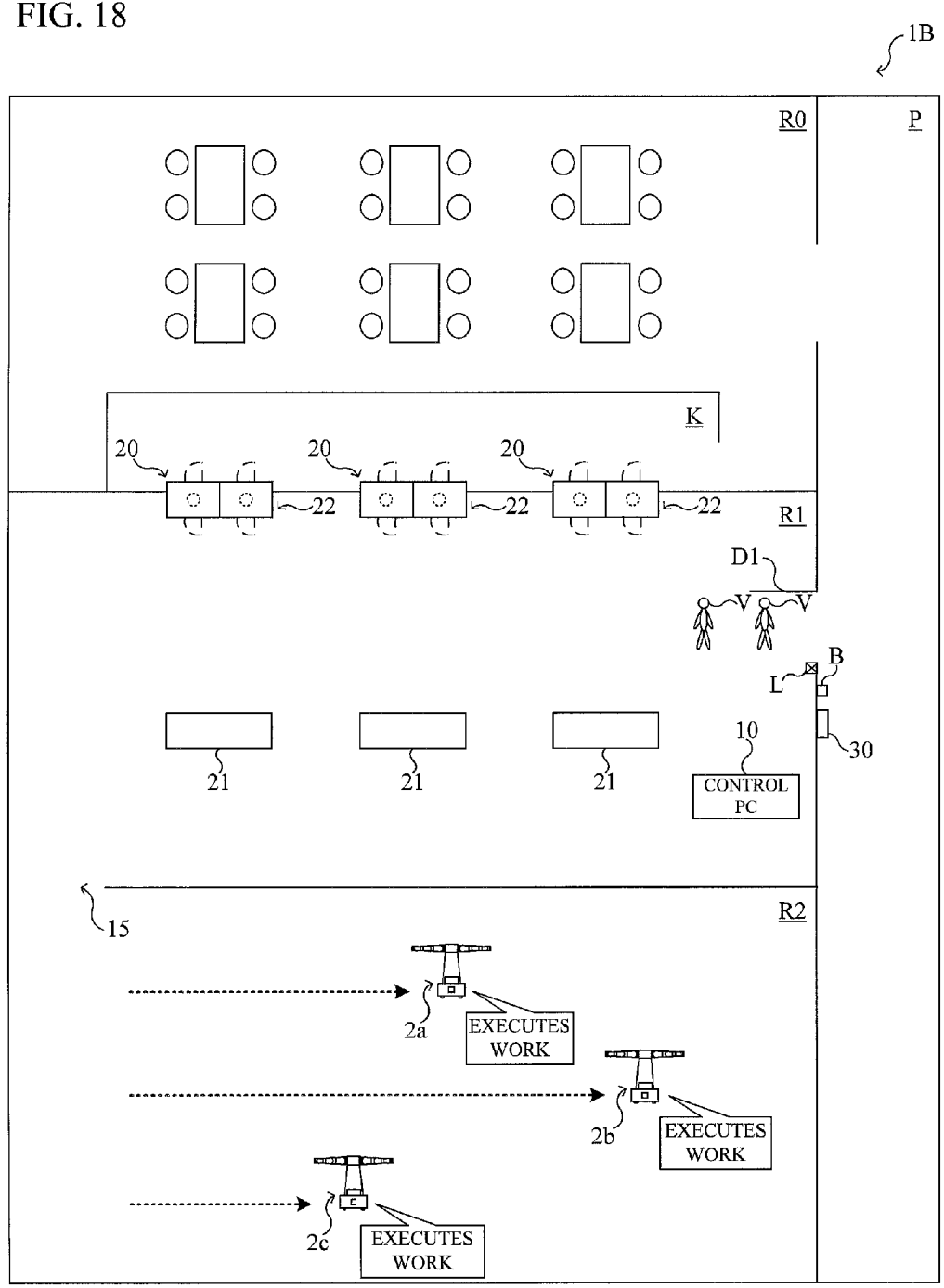
FIG. 18 is an explanatory view for explaining an example of the operation of each robot.

Then, when each of the robots 2a, 2b, and 2c moves to the room R2 and suspends work, the lock mechanism L subsequently unlocks the door D1. As a result, the visitors V can open the door D1 and enter the room R1. FIG. 18 shows a state in which the visitors V opened the door D1 and entered the room R1. As shown in FIG. 18, when the visitors V enter the room R1, each of the robots 2a, 2b, and 2c is in the room R2. Further, each of the robots 2a, 2b, and 2c that had moved to the room R2 as described above performs predetermined work (such as, for example, cleaning the floor, etc., transporting goods, sorting goods, etc.) as a second work in the room R2. Then, when all of the visitors V depart from the room R1, each of the robots 2a, 2b, and 2c that moved to the room R2 subsequently operates the AGV 7, returns via the walkway 15 to its position in the room R1 prior to suspension, and resumes work from the stage where the work was suspended as described above.

Figure 19:
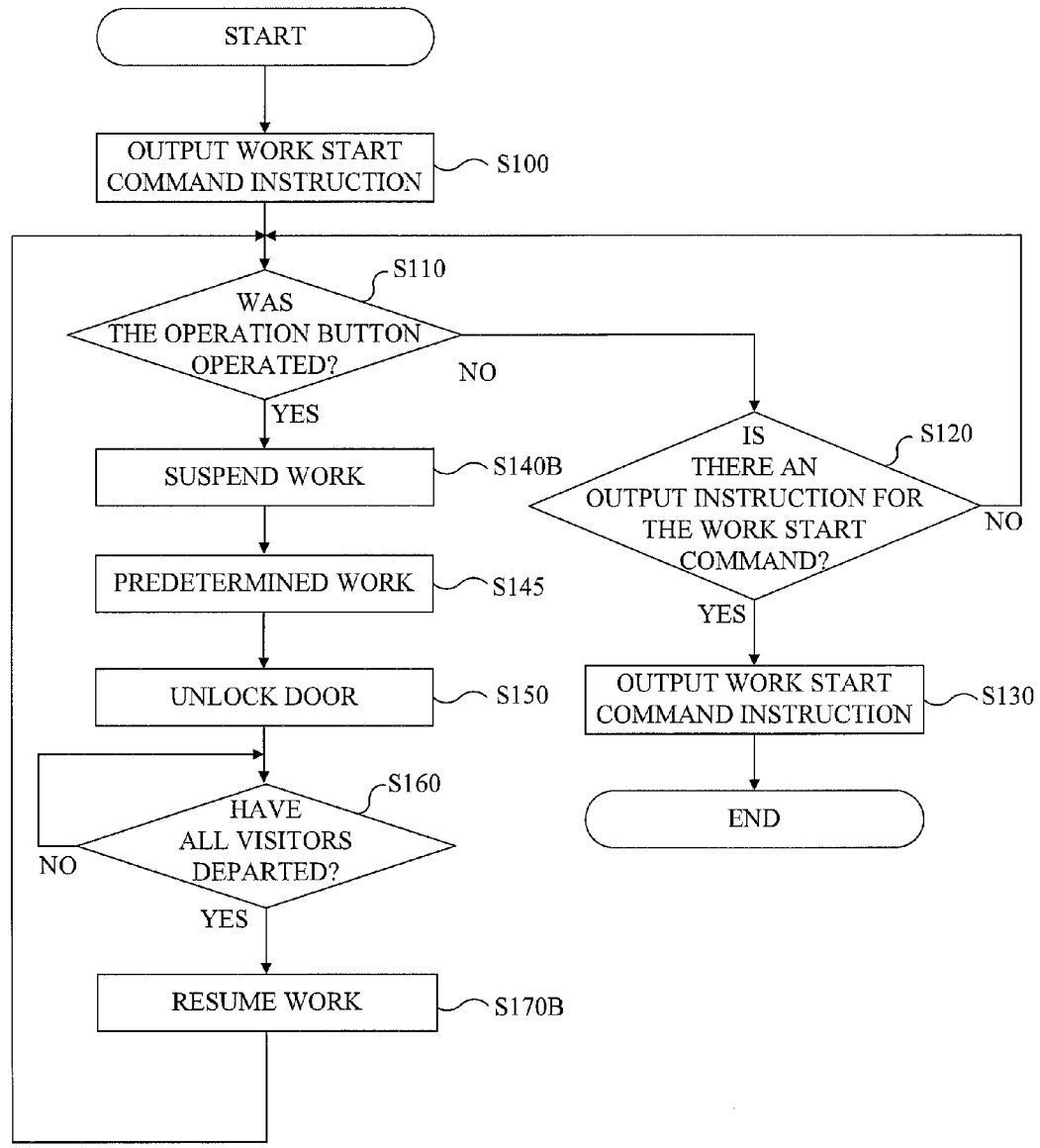
FIG. 19 is a flowchart showing an example of the control details executed by the control PC.

The following describes an example of the control details executed by the control PC 10 of this modification, using FIG. 19. Note that this FIG. 19 is linked to the FIG. 11 and FIG. 15, the same procedures as those in FIG. 11 are denoted using the same reference numerals, and descriptions thereof are suitably omitted or simplified.

In FIG. 19, the differences from the FIG. 11 lie in that steps S140B and S170B are provided in place of steps S140 and S170, and step S145 is newly provided between steps S140B and S150. Steps S100 to S130 are the same as those in the FIG. 11. That is, when the visitor V operates the operation button B, the decision is made that the condition of step S110 is satisfied, and the flow proceeds to step S140B provided in place of step S140.

In step S140B, the control PC 10 outputs a control signal for work suspension and movement (a control signal for controlling the AGV 7 of the robot 2 so that, once work is performed up to the suspendable stage, the robot 2 moves to the room R2) to each of the robot controllers 3a, 3b, and 3c. Then, each of the robot controllers 3a, 3b, and 3c that received this control signal controls the AGV 7 of the linked robot 2 so that, once work is performed up to the suspendable stage, the robot 2 moves to the room R2. As a result, the work by each of the robots 2a, 2b, and 2c is suspended. The procedure of this step S140B and the procedure of controlling the AGV 7 of the robot 2 that is executed by each of the robot controllers 3a, 3b, and 3c as described above are linked to the first suspension control portion as well as the suspension control means.

Then, the flow proceeds to the newly provided step S145 where the control PC 10 outputs to each of the robot controllers 3a, 3b, and 3c a control signal for controlling the robot 2 so that the robot 2 performs predetermined work in the room R2 to which it had moved. Then, each of the robot controllers 3a, 3b, and 3c that received this control signal controls the linked robot 2, causing the robot 2 to perform predetermined work in the room R2 to which it had moved. With this arrangement, each of the robots 2a, 2b, and 2c that had moved to the room R2 performs predetermined work in the room R2. The procedure of this step S145 and the procedure of controlling the robot 2 that is executed by each of the robot controllers 3a, 3b, and 3c as described above are linked to the second work control portion.

The subsequent steps S150 and S160 are the same as those in the FIG. 11. That is, once all of the visitors V have departed from the room R1, the decision is made that the condition of step S160 is satisfied and the flow proceeds to step S170B provided in place of step S170.

In step S170B, the control PC 10 outputs a control signal for position recovery (a control signal for controlling the AGV 7 of the robot 2 so that the robot 2 returns to its position prior to suspension in the room R1) to each of the robot controllers 3a, 3b, and 3c. Then, each of the robot controllers 3a, 3b, and 3c that received this control signal controls the AGV 7 of the linked robot 2, causing the robot 2 to return to its position prior to suspension in the room R1. With this arrangement, each of the robots 2*a*, 2*b*, and 2*c* that moved to the room R2 returns to its position prior to suspension in the room R1, and the work by each of the robots 2*a*, 2*b*, and 2*c* is resumed from the stage suspended. The procedure of this step S170B and the procedure of controlling the robot 2 that is executed by each of the robot controllers 3*a*, 3*b*, and 3*c* as described above are linked to the first resumption control portion.

In the modification described above, each of the robots 2*a*, 2*b*, and 2*c* that moved to the room R2 performs predetermined work in the room R2. With each of the robots 2*a*, 2*b*, and 2*c* thus made to perform predetermined work while staying in the room R2, it is possible to further improve productivity without wasting the time during which work is suspended in the room R1.

(3) When Only a Portion of Robots Stops Operation

While all of the robots 2*a*, 2*b*, and 2*c* stopped operation when the visitor V operated the operation button B in the previous modification, the present disclosure is not limited to such a form. That is, only a portion of the robots 2 may stop operation in such the case. Note that, according to this modification, the entire room R1 is linked to the first area as well as the area where entry is restricted.

Figure 20:
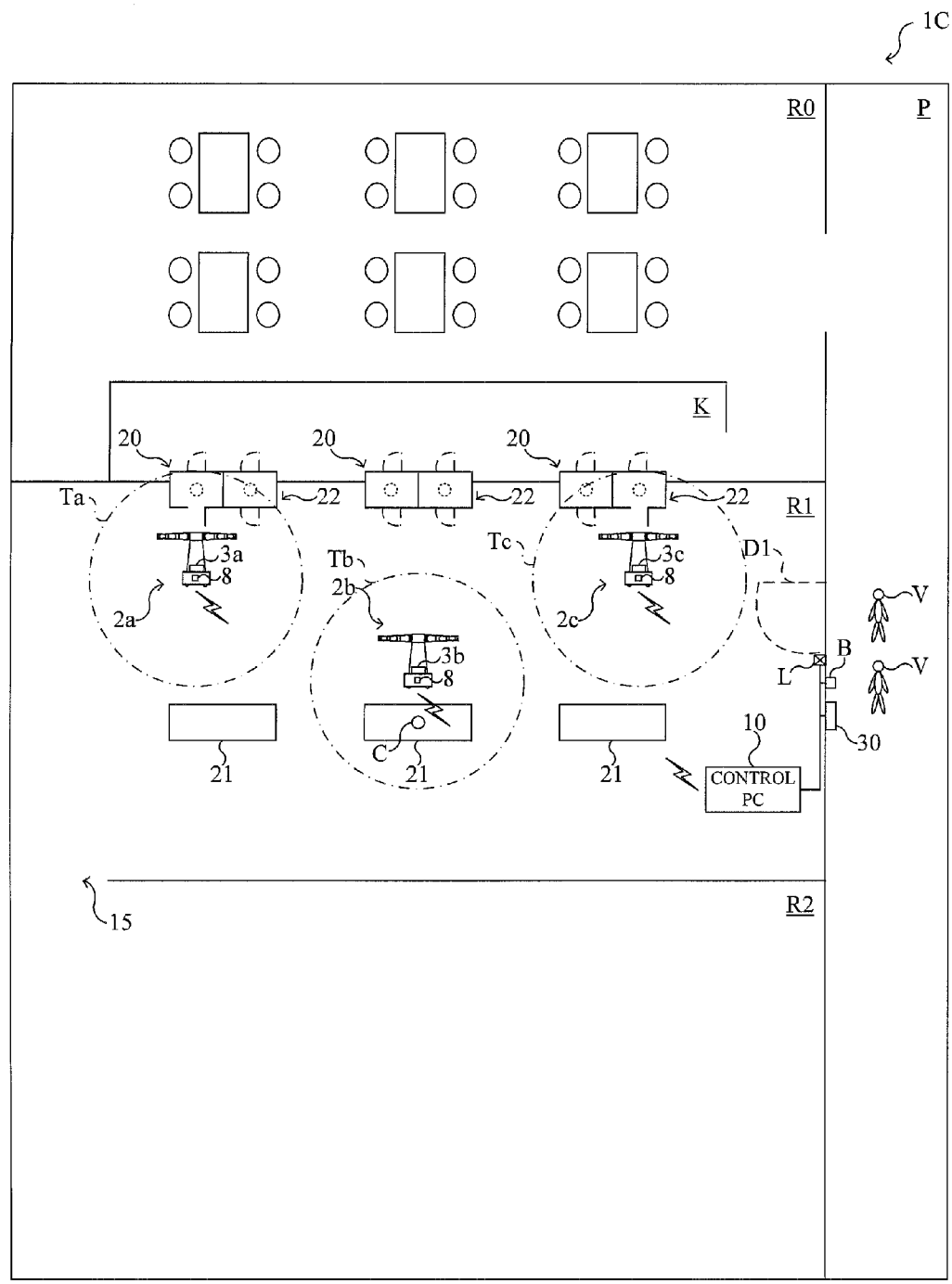
FIG. 20 is a system configuration diagram schematically showing the overall configuration of the robot system of a modification wherein only a portion of the robots stops operation.

As shown in FIG. 20, a robot system 1C of this modification has the same configuration as the robot system 1. That is, the robot system 1C comprises the three robots 2*a*, 2*b*, and 2*c*, the three robot controllers 3*a*, 3*b*, and 3*c*, and the control PC 10.

Each of the robots 2 has basically the same configuration as in the embodiment. According to this modification, a laser sensor 8 (linked to the second sensor) capable of detecting the visitor V who is in close proximity to the robot 2 is respectively provided to the front, rear, and both side surfaces of the AGV 7 of each of the robots 2. Each of the laser sensors 8 detects the visitor V who is in close proximity to a predetermined range of substantially 360 degrees around the linked robot 2 (in other words, the visitor V that is present within a predetermined range). That is, the laser sensor 8 of the robot 2*a* is capable of detecting the visitor V who is in close proximity to a range Ta of substantially 360 degrees around the robot 2*a*. The laser sensor 8 of the robot 2*b* is capable of detecting the visitor V who is in close proximity to a range Tb of substantially 360 degrees around the robot 2*b*. The laser sensor 8 of the robot 2*c* is capable of detecting the visitor V who is in close proximity to a range Tc of substantially 360 degrees around the robot 2*c*. Note that the ranges Ta, Tb, and Tc are hereinafter suitably referred to as the "ranges T" when indicated without distinction. Further, all of the laser sensors 8 provided to the robots 2*a*, 2*b*, and 2*c* are linked to the proximity detector.

Figure 21:
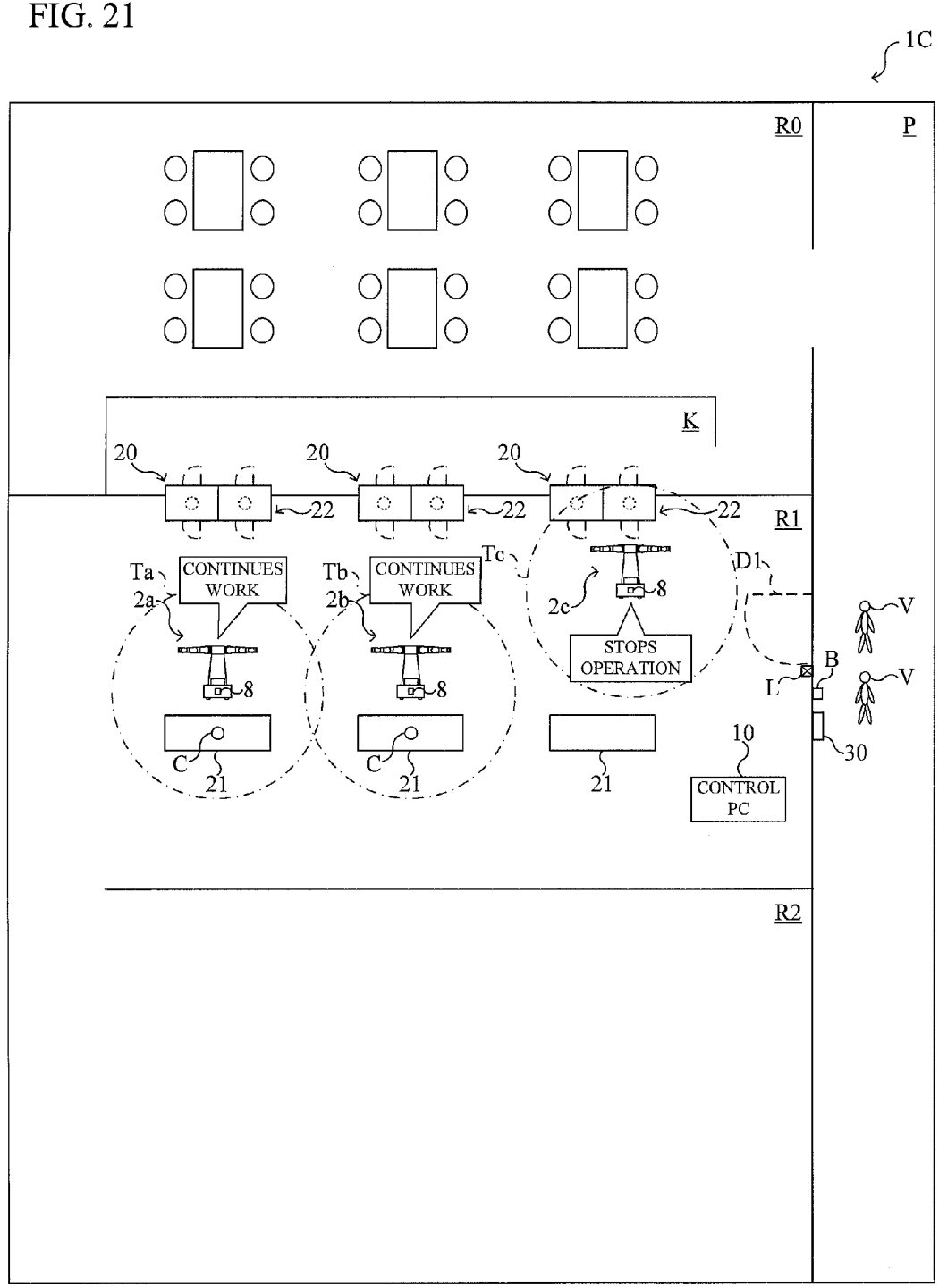
FIG. 21 is an explanatory view for explaining an example of the operation of each robot.

According to this modification, each of the robots 2*a*, 2*b*, and 2*c* performs the drink pouring work in the room R1. Then, the visitor V sometimes operates the operation button B when each of the robots 2*a*, 2*b*, and 2*c* performs work (specifically, any of the steps 1 to 6) in the room R1. In such a case, of the robots 2*a*, 2*b*, and 2*c*, the robot 2*c* which exists near the door D1, as an act of suspension, suspends work by stopping the operation executed up to that time after performing work up to the suspendable stage, as shown in FIG. 21. The other robots 2*a* and 2*b* continue working. Note that, according to this modification, the robot 2*c*, which exists near the door D1, is linked to the first robot as well as the predetermined robot. Further, in a case where the visitor V operates the operation button B as described above, the control PC 10 calculates the longest time until the robot 2*c* suspends work (in other words, until the visitors V can enter the room R1), and displays that time on the display portion 30.

Figure 22:
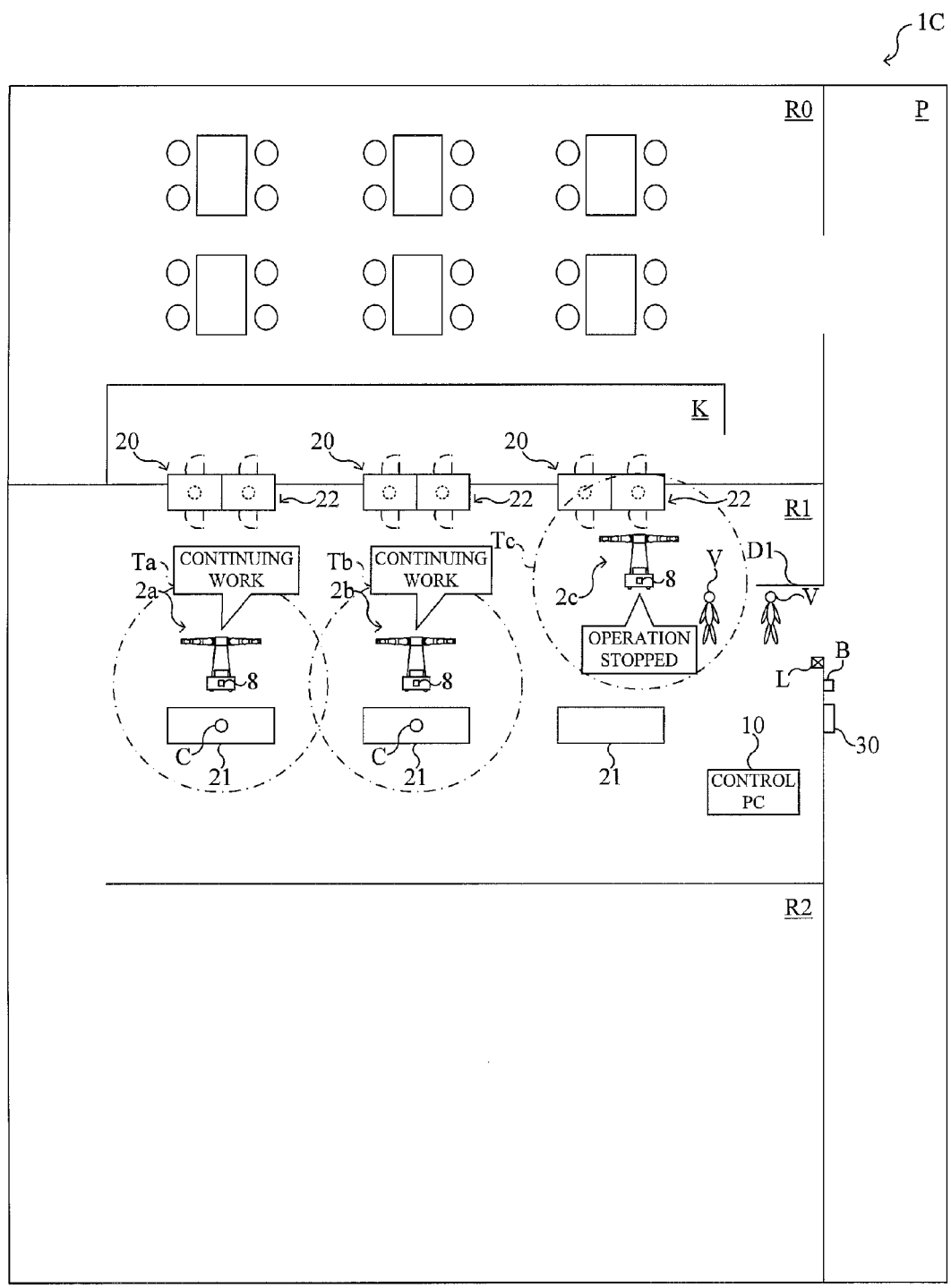
FIG. 22 is an explanatory view for explaining an example of the operation of each robot.

Then, when the robot 2*c* suspends work by stopping operation, the lock mechanism L subsequently unlocks the door D1, changing the state to one in which the visitors V can open the door D1 and enter the room R1. FIG. 22 shows a state in which the visitors V opened the door D1 and entered the room R1. As shown in FIG. 22, when the visitors V enter the room R1, the robot 2*c* which is near the door D1 is in a state of stopped operation. The robots other than the robot 2*c*, i.e., the robots 2*a* and 2*b*, continue working.

Here, in this modification, when the robots 2 other than the robot 2 that stopped operation perform work in the room R1, the laser sensors 8 of the robots 2 performing work sometimes detect the visitors V in close proximity to the ranges T related to the robots 2 (in other words, the visitors V sometimes become present within the ranges T). In such a case, according to this modification, the robot 2 (linked to the second robot) of the robots 2 performing work that detects the close proximity of the visitors V to the range T suspends work by stopping the operation executed up to that time (see FIG. 23 described later). Further, when the operation of one or more robots 2 is stopped and the work by the robots 2 is suspended, that is, when there are one or more robots 2 that have stopped operation, sometimes the laser sensors 8 of the robots 2 that have stopped operation no longer detect the visitors V in close proximity to the ranges T related to the robots 2 (in other words, sometimes the visitors V are not present within the ranges T). In such a case, according to this modification, the robot 2 that no longer detects the close proximity of the visitors V cancels the state of stopped operation and resumes work (see FIG. 23 described later).

Figure 23:
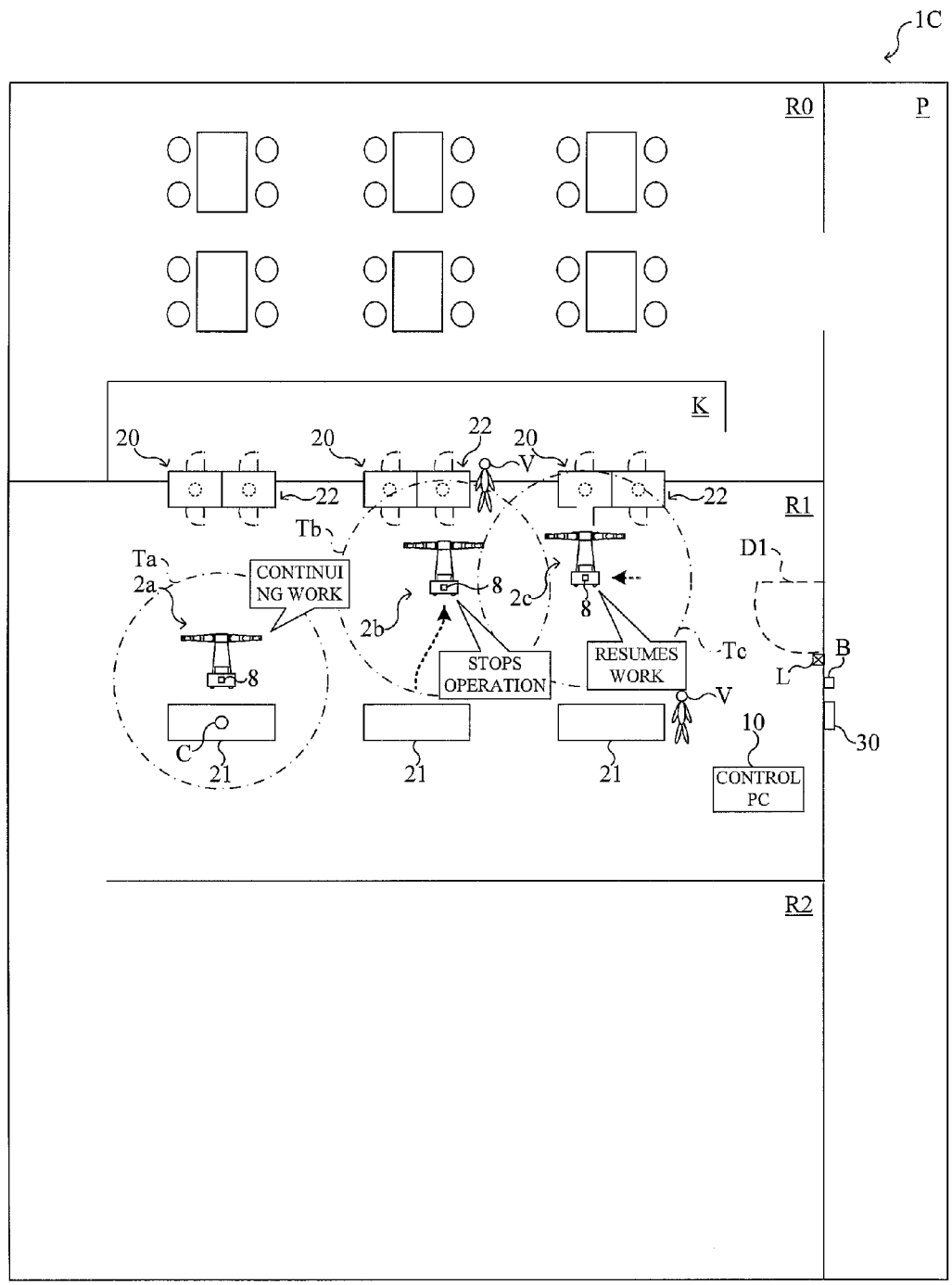
FIG. 23 is an explanatory view for explaining an example of the operation of each robot.

FIG. 23 shows a state in which the visitors V have moved from the position shown in the FIG. 22. As shown in FIG. 23, the robot 2*a* that was executing work in the FIG. 22 continues to execute work since the visitors V are not present within the range Ta (the visitors V are far away from the robot 2*a*). Further, as a result of the movement of the robot 2*b* that was executing work in the FIG. 22 and the movement of the visitors V, the visitors V are present within the range Tb (the visitors V have become in close proximity to the robot 2*b* or the robot 2*b* has become in close proximity to the visitors V). As a result, the robot 2*b* suspends work by stopping the operation executed up to that time. Further, as a result of the movement of the visitors V, the visitors V are no longer present within the range Tc related to the robot 2*c* (the visitors V have moved away from the robot 2*c*). As a result, the robot 2*c* that had stopped operation in the FIG. 22 cancels the state of stopped operation and resumes work. Note that, according to the example shown in this FIG. 23, the robot 2*b* is linked to the second robot.

Figure 24:
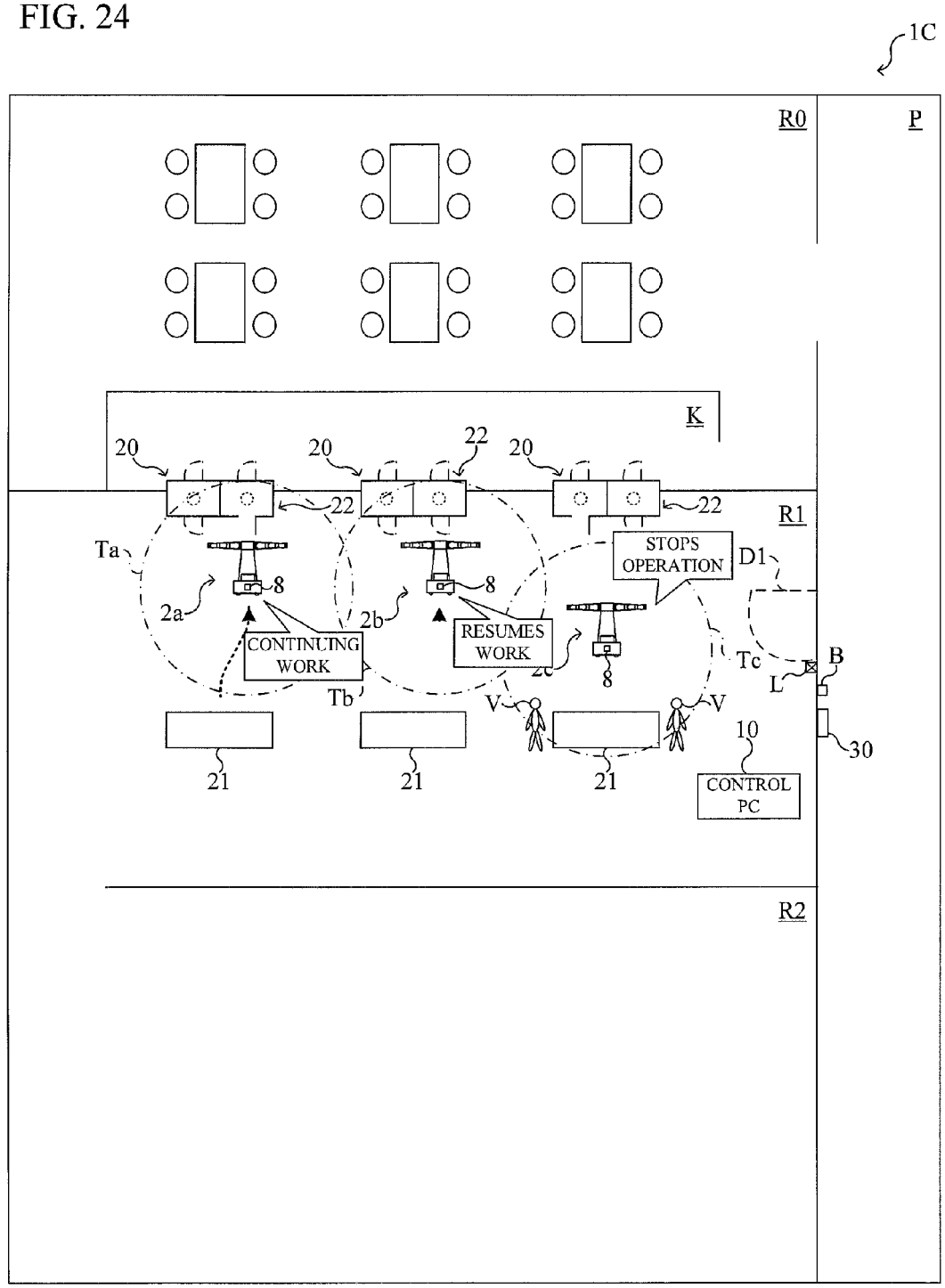
FIG. 24 is an explanatory view for explaining an example of the operation of each robot.

FIG. 24 shows a state in which the visitors V have moved further from the position shown in the FIG. 23. As shown in FIG. 24, the robot 2*a* that was executing work in the FIG. 23 continues to execute work since the visitors V are not present within the range Ta (the visitors V are far away from the robot 2*a*). Further, as a result of the movement of the visitors V, the robot 2*b* that had stopped operation in the FIG. 23 cancels the state of stopped operation and resumes work since the visitors V are no longer present within the range Tb (the visitors V moved away from the robot 2*b*). Further, as a result of the movement of the robot 2*c* and the movement of the visitors V, the robot 2*c* that had resumed work in the FIG. 23 has suspended work by stopping the operation executed up to that time since the visitors V are present within the range Tc (the visitors V have become in close proximity to the robot 2*c* or the robot 2*c* has become in close proximity to the visitors V).

Note that, according to the example shown in this FIG. 24, the robot 2c is linked to the second robot.

Figure 25:
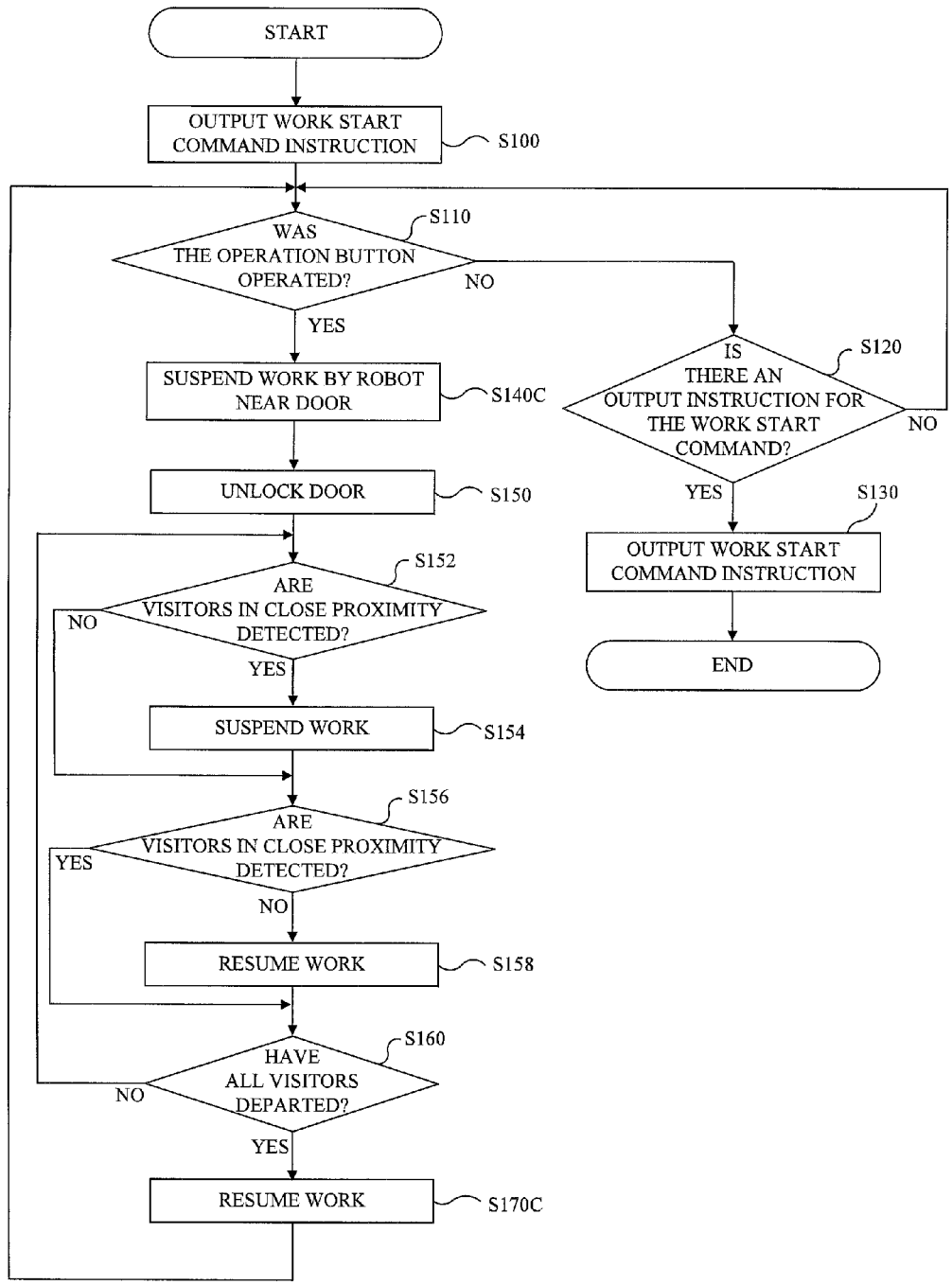
FIG. 25 is a flowchart showing an example of the control details executed by the control PC.

The following describes an example of the control details executed by the control PC 10 of this modification, using FIG. 25. Note that this FIG. 25 is linked to the above FIG. 11, FIG. 15, and FIG. 19, the same procedures as those in FIG. 11 are denoted using the same reference numerals, and descriptions thereof are suitably omitted or simplified.

In FIG. 25, the differences from the FIG. 11 lie in that steps S140C and S170C are provided in place of steps S140 and S170, and steps S152, S154, S156, and S158 are newly provided between steps S150 and S160. Steps S100 to S130 are the same as those in the FIG. 11. That is, when the visitor V operates the operation button B, the decision is made that the condition of step S110 is satisfied, and the flow proceeds to step S140C provided in place of step S140.

In step S140C, the control PC 10 outputs a control signal for suspending work (a control signal for controlling the robot 2c so that the robot 2c stops the operation executed up to that time after performing work to the suspendable stage) to the robot controller 3c. Then, the robot controller 3c that received this control signal controls the robot 2c so that the robot 2c stops the operation executed up to that time after performing work up to the suspendable stage. As a result, the robot 2c suspends work. The procedure of this step S140C and the procedure of controlling the robot 2c that is executed by the robot controller 3c as described above are linked to the first suspension control portion as well as the suspension control means.

The subsequent step S150 is the same as that in the FIG. 11. That is, once the lock mechanism L is controlled so that it unlocks the door D1, the flow proceeds to the newly provided step S152.

In step S152, the control PC 10 determines whether or not the laser sensors 8 of the robots 2 currently executing work detected the visitors V in close proximity to the ranges T related to the robots 2. In a case where the visitors V in close proximity to the ranges T related to the robots 2 currently executing work are not detected (in other words, in a case where the visitors V are not present within the ranges T), the decision is made that the condition of step S152 is not satisfied, and the flow proceeds to step S156 described later. On the other hand, in a case where the visitors V in close proximity to the ranges T related to the robots 2 currently executing work are detected (in other words, in a case where the visitors V are present within the ranges T), the decision is made that the condition of step S152 is satisfied, and the flow proceeds to the newly provided step S154.

In step S154, the control PC 10 outputs a control signal for suspending work (a control signal for controlling the robot 2 so that the robot 2 stops the operation executed up to that time) to the robot controller 3 linked to the robot 2 of the robots 2 executing work that detected the close proximity of the visitors V to the range T. Then, the robot controller 3 that received this control signal controls the linked robot 2 so that the robot 2 stops the operation executed up to that time. With this arrangement, the work by the robot 2 of the robots 2 executing work that detected the close proximity of the visitors V to the range T is suspended. The procedure of this step S154 and the procedure of controlling the robot 2 that is executed by the robot controller 3 as described above are linked to the second suspension control portion.

Then, the flow proceeds to the newly provided step S156 where the control PC 10 determines whether or not the laser sensors 8 of the robot 2 that stopped operation detected the visitors V in close proximity to the range T related to the robot 2. In a case where the visitors V in close proximity to the range T related to the robot 2 that stopped operation are detected (in other words, in a case where the visitors V are present within the range T), the decision is made that the condition of step S156 is satisfied, and the flow proceeds to the step S160. On the other hand, in a case where the visitors V in close proximity to the range T related to the robot 2 that stopped operation are not detected (in other words, in a case where the visitors V are not present within the range T), the decision is made that the condition of step S156 is not satisfied, and the flow proceeds to the newly provided step S158.

In step S158, the control PC 10 outputs a control signal for resuming work (a control signal for controlling the robot 2 so that the robot 2 cancels the state of stopped operation) to the robot controller 3 linked to the robot 2 of the stopped robots 2 that did not detect the close proximity of the visitors V (in other words, the robot 2 for which the visitors V are not present within the range T). Then, the robot controller 3 that received this control signal controls the linked robot 2 so that the robot 2 cancels the state of stopped operation. With this arrangement, the work by the robot 2 of the stopped robots 2 that did not detect the close proximity of the visitors V is resumed. The procedure of this step S158 and the procedure of controlling the robot 2 that is executed by the robot controller 3 as described above are linked to the second resumption control portion.

The subsequent step S160 is the same as that in the FIG. 11. That is, the control PC 10 determines whether or not all of the visitors V who entered the room R1 departed from the room R1. Until all of the visitors V depart from the room R1, the decision is made that the condition of step S160 is not satisfied, the flow returns to the step S152, and the same procedure is repeated. Once all of the visitors V have departed from the room R1, the decision is made that the condition of step S160 is satisfied and the flow proceeds to step S170C provided in place of step S170.

In step S170C, the control PC 10 outputs a control signal for resuming work (a control signal for controlling the robot 2 so that the robot 2 cancels the state of stopped operation) to the robot controller 3 linked to the robot 2 that stopped operation. Then, the robot controller 3 that received this control signal controls the linked robot 2 so that the robot 2 cancels the state of stopped operation. As a result, the robot 2 that stopped operation resumes work from the suspended stage. The procedure of this step S170C and the procedure of controlling the robot 2 that is executed by the robot controller 3 as described above are linked to the first resumption control portion.

In this modification described above, in a case where the visitor V operates the operation button B when each of the robots 2a, 2b, and 2c is performing work in the room R1, the robot 2c that is near the door D1 stops the operation executed up to that time after performing work to the suspendable stage. Further, the other robots 2a and 2b continue working. In this manner, not all of the robots 2a, 2b, and 2c, but only the robot 2c that exists near the door D1 which has a high possibility of first encountering the entry of the visitors V into the room R1 is made to stop operation. With this arrangement, it is possible to improve the operation rate and productivity compared to a case where all of the robots 2a, 2b, and 2c are made to stop operation. Further, in this modification, each of the robots 2a, 2b, and 2c comprises the laser sensors 8. When the robots 2 other than the robot 2 that stopped operation perform work in the room R1, the laser sensors 8 of the robots 2 executing work sometimes detect the visitors V in close proximity to the ranges T related to the robots 2. In such a case, according to this modification, the robot 2 of the robots 2 executing work that detects the close proximity of the visitors V to the range T suspends work by stopping the operation executed up to that time. As a result, the state within the room R1 can transition to one in which the operation of the robot 2 in close proximity to the visitors V is stopped As a result, contact between the visitors V that stay in the room R1 and the robot 2 in close proximity to the visitors V can be prevented.

Further, in this modification, when the operation of one or more of the robots 2 is stopped and work by the robots 2 is suspended (that is, when there are one or more robots 2 that have stopped operation), sometimes the laser sensors 8 of the robots 2 that stopped operation no longer detect the visitors V in close proximity to the ranges T related to the robots 2. In such a case, according to this modification, the robot 2 that no longer detects the close proximity of the visitors V cancels the state of stopped operation and resumes work. With this arrangement, it is possible to resume the suspended work by the robot 2 at the point in time that the visitors V move away from the robot 2 that had stopped operation. Accordingly, it is possible to avoid defects including the resumption of work by the robot 2 when the visitors V are still close by and the non-resumption of work by the robot 2 despite the visitors V not being close by.

Further, in this modification, the laser sensor 8 is respectively provided to the front, rear, and both side surfaces of the AGV 7 of each of the robots 2a, 2b, and 2c to execute detection in the substantially 360 degree area around the robot 2. With the establishment of the substantially 360 degree area around each of the robots 2a, 2b, and 2c as the detectable range of the visitor V, it is possible to improve the detection accuracy of the visitor V in close proximity to each of the robots 2a, 2b, and 2c.

(4) When Operation is Decelerated

While each of the robots 2a, 2b, and 2c suspended work by stopping the operation executed up to that time when the visitor V operated the operation button B in the above, the present disclosure is not limited thereto. That is, work may be suspended by decelerating the speed of the operation executed up to that time to a predetermined speed (for example, a safe speed even if contacted by the visitor V; in other words, a nearly stopped speed) or less. In such a case, the act of decelerating the speed of operation executed up to that time to a predetermined speed or less is linked to the act of suspension. In this modification as well, the same advantages as those of the embodiment are achieved.

(5) When the Visitor is Detected by a Sensor

In the above, the visitor V attempting to enter the room R1 is detected by the operation of the operation button B provided near the door D1 of the passageway P. Nevertheless, the disclosure is not limited to such a form. That is, the visitor V attempting to enter the room R1 may be detected by having a suitable sensor (for example, a laser sensor, infrared sensor, camera, etc.) provided near the door D1, for example, detect the visitor V that has become in close proximity to the door D1. According to this modification, when the visitor V has become so close in proximity to the door D1 so as to be detected by the sensor (linked to when the act of unlocking is performed), the lock mechanism L unlocks the door D1. Note that, according to this modification, the sensor is linked to the first sensor and the visitor detector. In this modification as well, the same advantages as those of the embodiment, etc., are achieved. Further, with the use of the sensor for detection of the visitor V attempting to enter the room R1, it is possible to decrease the labor burden of the visitor V compared to a case where detection is made based on a manual operation performed by the visitor V. Further, it is possible to avoid the defect of detection failure caused by the visitor V forgetting to perform the operation, etc.

(6) When the Visitor is Detected by a Reader

That is, a suitable reader (for example, an IC tag reader, magnetic strip card reader, barcode tag reader, etc.) that reads authentication information (for example, the ID of the visitor V, etc.) for entry into the room R1 from a suitable authentication tag (for example, an IC tag, magnetic strip card, barcode tag, etc.) provided with the authentication information may be provided near the door D1 of the passageway P. In such a case, the authentication information is read via the visitor V from the authentication tag to this reader in accordance with a proximity or contact operation of the authentication tag held by the visitor V. As a result of this reading, the visitor V attempting to enter the room R1 is detected. According to this modification, in a case where the authentication tag is subject to a proximity or contact operation with the reader by the visitor V (linked to when the act of unlocking is performed), the lock mechanism L unlocks the door D1. Note that, according to this modification, the reader is linked to the information reading device and visitor detector. In this modification as well, the same advantages as those of the embodiment are achieved. Further, with detection of the visitor V attempting to enter the room R1 by the reader, entry into the room R1 by the visitor V can be individually restricted based on the authentication information of the authorization tag held by the visitor V. As a result, entry restricted rooms can be individually set for the visitor V, making it possible to ensure security and safety.

(7) Other

While the laser sensors 8 of each of the robots 2a, 2b, and 2c detect the visitors V in close proximity to each of the robots 2a, 2b, and 2c in the previous modification of (3), the present disclosure is not limited to this form. That is, sensors such as an infrared sensor, camera, or the like may be provided to each of the robots 2a, 2b, and 2c so that these sensors detect the visitors V in close proximity to each of the robots 2a, 2b, and 2c. In such a case, the sensor is linked to the second sensor, and all of the sensors provided to the robots 2a, 2b, and 2c are linked to the proximity detector. In this modification as well, the same advantages as those of the embodiment are achieved.

Further, the visitors V in close proximity to each of the robots 2a, 2b, and 2c may be detected by a suitable sensor (for example, a laser sensor, infrared sensor, camera, etc.) provided to a suitable position in the room R1. In such a case, the sensor is linked to the proximity detector. In this case as well, the same advantages as those of the embodiment are achieved.

Further, while the above describes an illustrative scenario in which the robot system 1, etc., is applied to an office building comprising a cafeteria where a food and drink service is provided and each of the robots 2 perform drink pouring work in the room R1, the present disclosure is not limited to this form. That is, the present disclosure may be applied to a case where each of the robots performs other work (for example, inspection of specimens, such as portions of blood, cerebrospinal fluid, urine, tissue, etc.; cleaning, such as the cleaning of the floor of a room; the transport of goods; the sorting of goods; etc.) as well. In such a case, the other work is linked to the first work as well as the work including one or more steps. In this case as well, the same advantages as those of the embodiment, etc., are achieved.

Further, while in the above each of the robots 2a, 2b, and 2c is made of the robot main body 4 and the AGV 7 which is separate from this robot main body 4, and movement is performed by the AGV 7, the present disclosure is not limited to this form. That is, the AGV 7 may be omitted and a suitable moving device (a device equivalent to the foot of a person, for example) may be provided to the robot main body itself, with movement performed by this moving device. In this case as well, the same advantages as those of the embodiment, etc., are achieved.

Further, while three robots 2 are provided in the above, the present disclosure is not limited thereto, allowing provision of two or less or four or more robots 2.

Further, the flows shown in the FIG. 10, FIG. 11, FIG. 15, FIG. 19, and FIG. 25 are not limited to the procedures shown in the embodiments, allowing procedures to be added, deleted, and changed in terms of order without departing from the spirit and scope of the disclosure.

Further, other than that already stated above, techniques based on the above embodiments and each of the modifications may be suitably used in combination well.

Although other examples are not individually described herein, various changes can be made to the above embodiments and modifications without departing from the spirit and scope of the present disclosure.

What is claimed is:

1. A robot system, comprising
    one or more robots which are provided to a first area where an entry by a person is restricted, and configured to perform a first work which includes one or more steps in the first area;
    a controller configured to control an operation of the one or more robots; and
    a visitor detector configured to detect a visitor to the first area;
    wherein the controller is configured to execute:
        a first work control of controlling the one or more robots so that the one or more robots perform the first work in the first area;
        a first determination process of determining whether or not the visitor is detected by the visitor detector when one or more of the robots are performing one of the steps in the first area based on the first work control process; and
        a first suspension control process of controlling at least a first robot of the one or more of the robots in a case that in the first determination process it is determined that the visitor is detected and it is a stop at one stage of predetermined inconvenience stages if the operation performed is suspended at that point in time, so that the first robot performs a predetermined act of suspension after performing the first work up to another step after the one step.

2. The robot system according to claim 1, wherein the controller is further configured to execute a lock control process of controlling a lock mechanism capable of locking an opening/closing door provided to an entrance of the first area; and
    in the lock control process, portion controls the lock mechanism is controlled so that the lock mechanism unlocks the opening/closing door after the first robot performs the act of suspension and suspends the first work based on control in the first suspension control process when a predetermined act of unlocking is performed.

3. The robot system according to claim 2, wherein
    in the first suspension control process, the first robot is controlled so that the first robot, as the act of suspension, stops or decelerates an operation executed up to that time.

4. The robot system according to claim 2, wherein
    the one or more robots comprise a moving device for performing movement; and
    in the first suspension control process, the moving device of the first robot is controlled so that moving device, as the act of suspension, moves to a second area separate from the first area.

5. The robot system according to claim 4, wherein the controller is further configured to execute a second work control process so that the first robot which moved to the second area based on control in the first suspension control process performs a predetermined second work in the second area.

6. The robot system according to claim 1, wherein
    the visitor detector is an operation device for the visitor to instruct entry into the first area, or a first sensor configured to detect the visitor who is in close proximity to an entrance of the first area, or an information reading device configured to read authentication information for entry into the first area from an authentication tag provided with the authentication information, in accordance with a proximity or contact operation of the authentication tag by the visitor.

7. The robot system according to claim 3, wherein
    the controller is further configured to execute:
        a departure detecting process of detecting a departure of the visitor from the first Area; and
        a first resumption control process of controlling either the first robot so that the first robot cancels a state of stopped or decelerated operation, or the moving device of the first robot so that moving device returns to the first area, causing the first robot to resume the first work, in a case where departure of all of the visitors is detected in the departure detecting process when operation of the first robot is stopped or decelerated based on control in the first suspension control process or the first robot has moved to a second area separate from the first area based on control in the first suspension control process, and the first work by the first robot has been suspended.

8. The robot system according to claim 1, wherein
    the robots are provided in a plurality to the first area;
    in the first suspension control process, as the act of suspension, a part of the first robots of the plurality of robots which is near the entrance of the first area are controlled so that the first robot stops or decelerates an operation executed up to that time, and wherein
    the robot system further comprises a proximity detector configured to detect the visitor who is in close proximity to a predetermined range around each of the robots, and wherein
    the controller is further configured to execute:
        a second determination process of determining whether or not the visitor in the close proximity of a robot other than the robot which has stopped or decelerated an operation is detected by the proximity detector when the robot other than the robot which has stopped or decelerated the operation is performing one of the steps in the first area based on control in the first work control process; and
        a second suspension control process of controlling a second robot which detected a close proximity of the visitor so that the second robot stops or decelerates an operation executed up to that time, in a case where in the second determination process it is determined that the visitor in the close proximity is detected.

9. The robot system according to claim 8, wherein
    the controller is further configured to execute a second resumption control process of controlling at least one of the first and second robots so that at least one of the first and second robots cancels the state of stopped or decelerated operation, causing at least one of the first and second robots to resume the first work in a case where it is determined that the visitor in the close proximity of at least one of the first and second robots is no longer detected in the second determination process when an operation of at least one of the first and second robots has been stopped or decelerated and the first work by at least one of the first and second robots has been suspended based on control in at least one of the first and second suspension control processes.

10. The robot system according to claim 8, wherein the proximity detector is made of one or more second sensors which are provided to each of the plurality of robots and are capable of detection in a substantially 360 degree area around the robot.

11. The robot system according to claim 1, wherein the controller is further configured to execute a time calculating process of calculating the longest time until each of the robots suspends work by the first suspension control process, wherein the robot system further comprises a display portion configured to the longest time calculated in the time calculating process.

12. A robot system comprising:

a robot provided within an area where an entry by a person is restricted, the robot being configured to perform a work operation including one or more steps that are performed in the area;

a controller configured to control the robot to perform the work operation; and a visitor detector configured to detect a visitor to the first area, wherein the controller is configured to execute:

a determination process for determining whether the visitor is detected by the visitor detector during the work operation; and a suspension control process for controlling the robot when the visitor is detected during the work operation, wherein, if the suspension control process determines that the work operation is at a predetermined inconvenience stage when the visitor is detected, then the suspension control process suspends the work operation of the robot after completion of the predetermined inconvenience stage.

* * * * *